Dec. 12, 1967    T. A. BANNING, JR    3,358,079
STEREOSCOPIC TELEVISION INCLUDING MEANS TO
SELECT EITHER THREE DIMENSIONAL OR TWO
DIMENSIONAL RECEPTION
Filed Aug. 2, 1963    11 Sheets-Sheet 1

Inventor:
Thomas A. Banning, Jr.

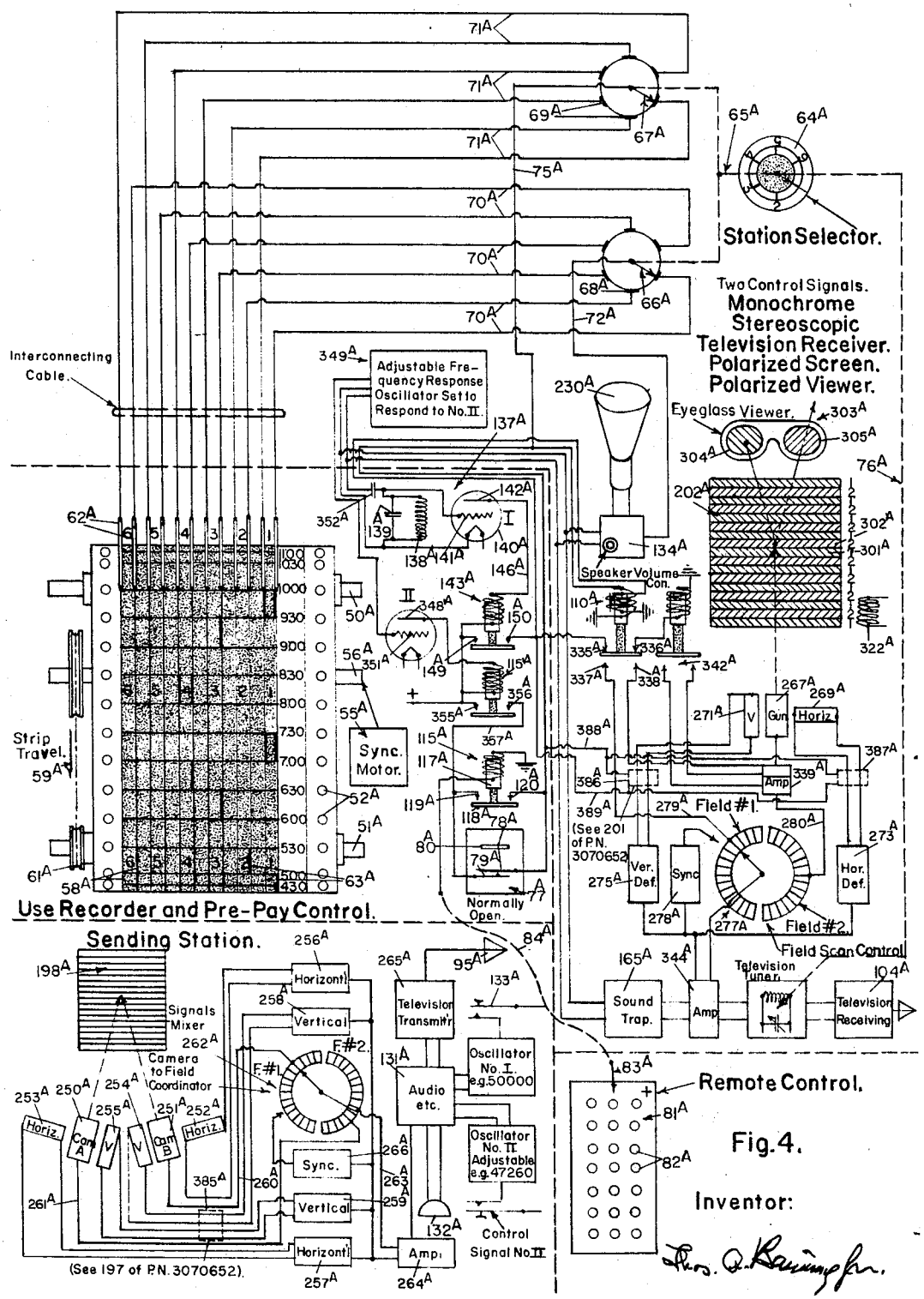

Dec. 12, 1967
T. A. BANNING, JR 3,358,079
STEREOSCOPIC TELEVISION INCLUDING MEANS TO
SELECT EITHER THREE DIMENSIONAL OR TWO
DIMENSIONAL RECEPTION
Filed Aug. 2, 1963
11 Sheets-Sheet 5
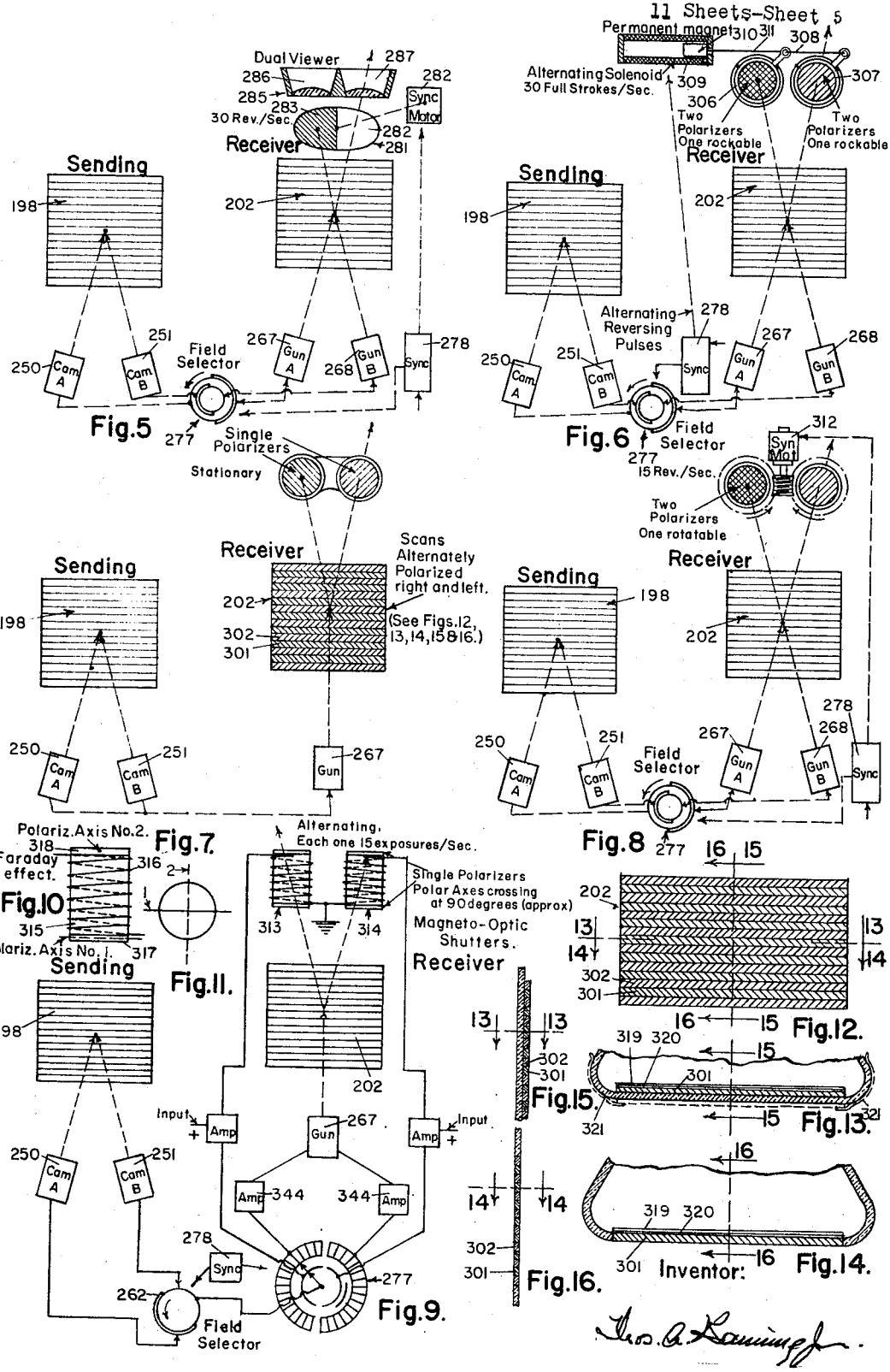

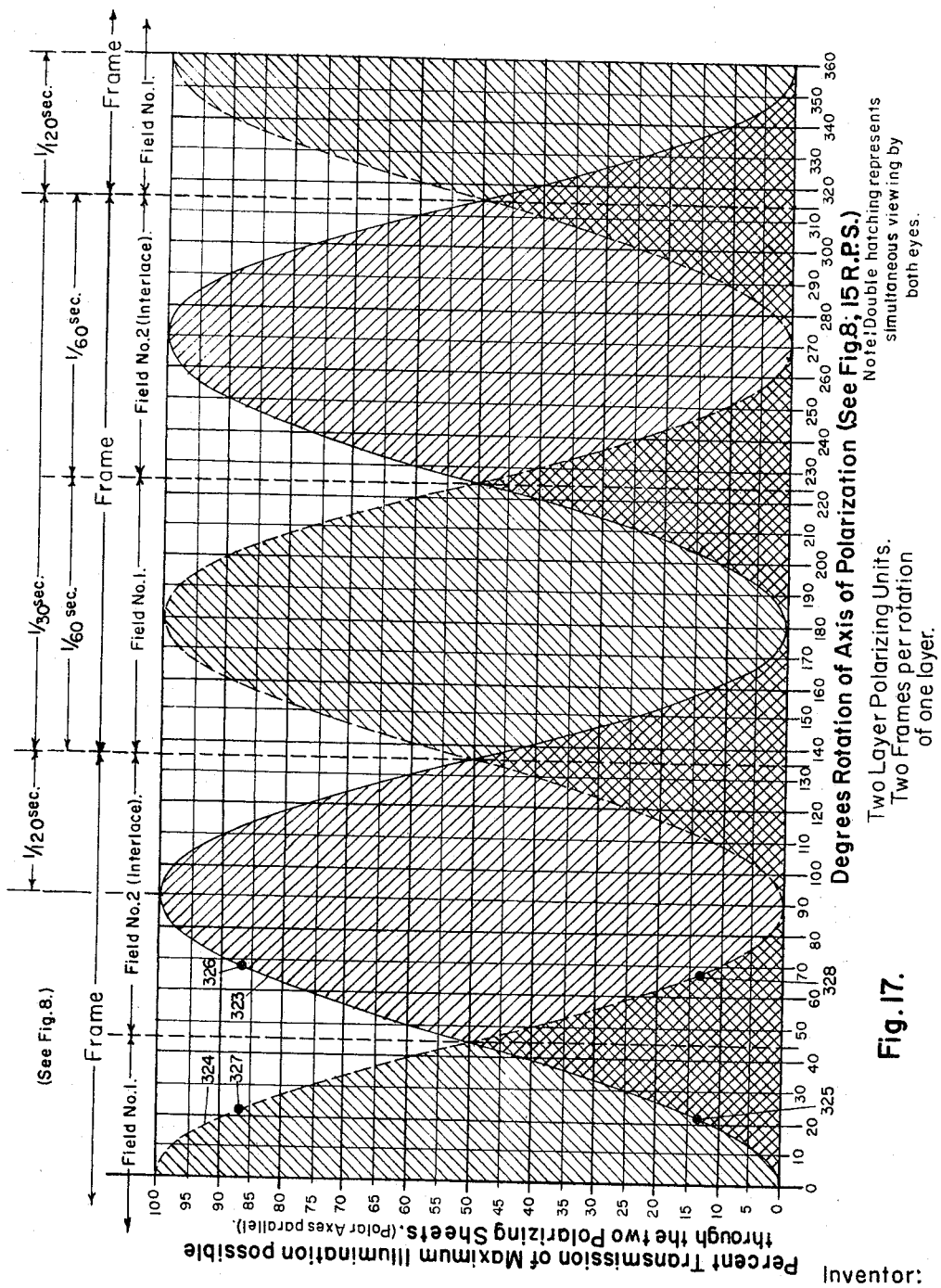

Dec. 12, 1967

T. A. BANNING, JR 3,358,079

STEREOSCOPIC TELEVISION INCLUDING MEANS TO
SELECT EITHER THREE DIMENSIONAL OR TWO
DIMENSIONAL RECEPTION

Filed Aug. 2, 1963

Inventor:
Thos. A. Banning Jr.

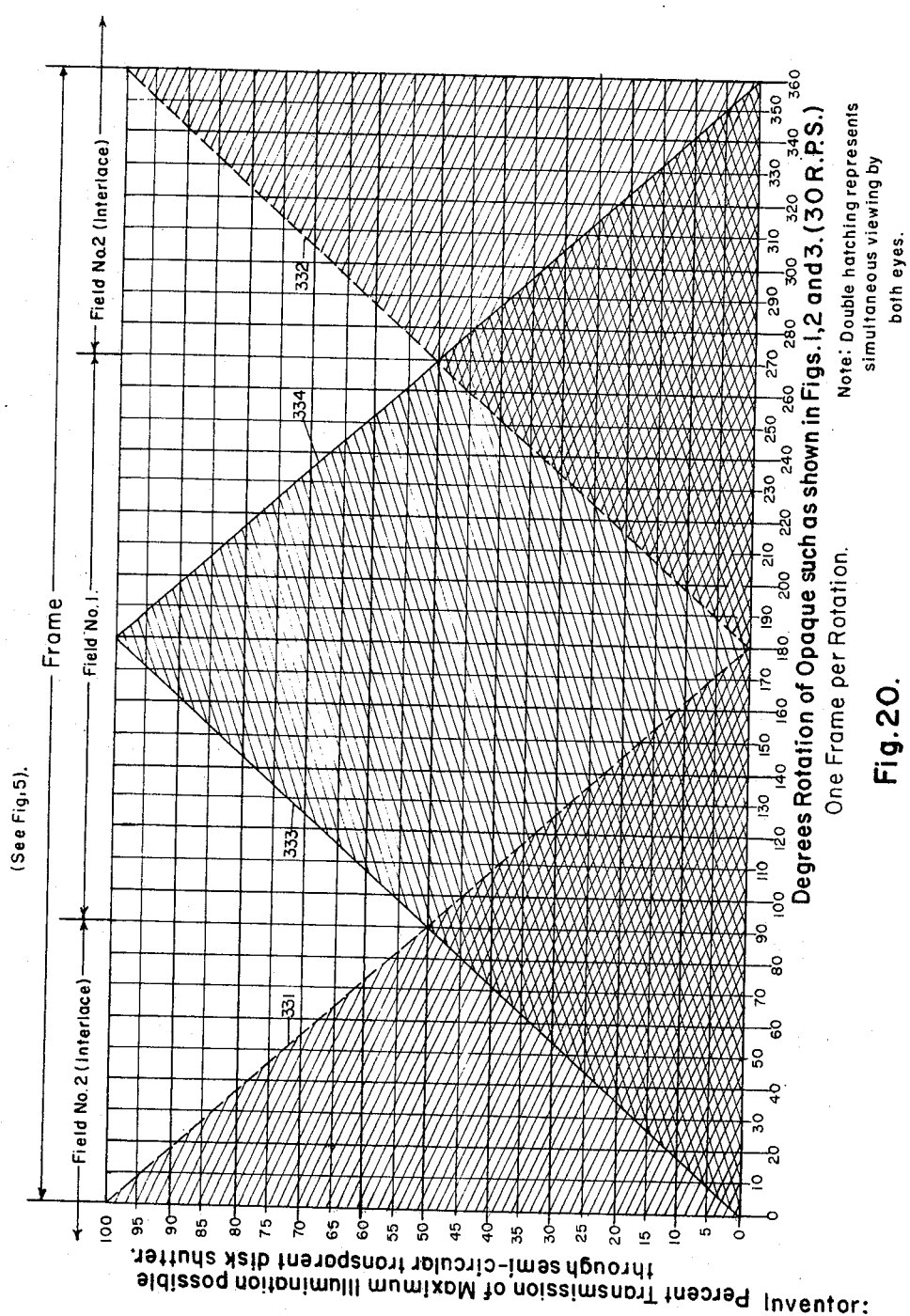

Dec. 12, 1967　　　　T. A. BANNING, JR　　　　3,358,079
STEREOSCOPIC TELEVISION INCLUDING MEANS TO
SELECT EITHER THREE DIMENSIONAL OR TWO
DIMENSIONAL RECEPTION
Filed Aug. 2, 1963　　　　　　　　　　　　11 Sheets-Sheet 9

Inventor:

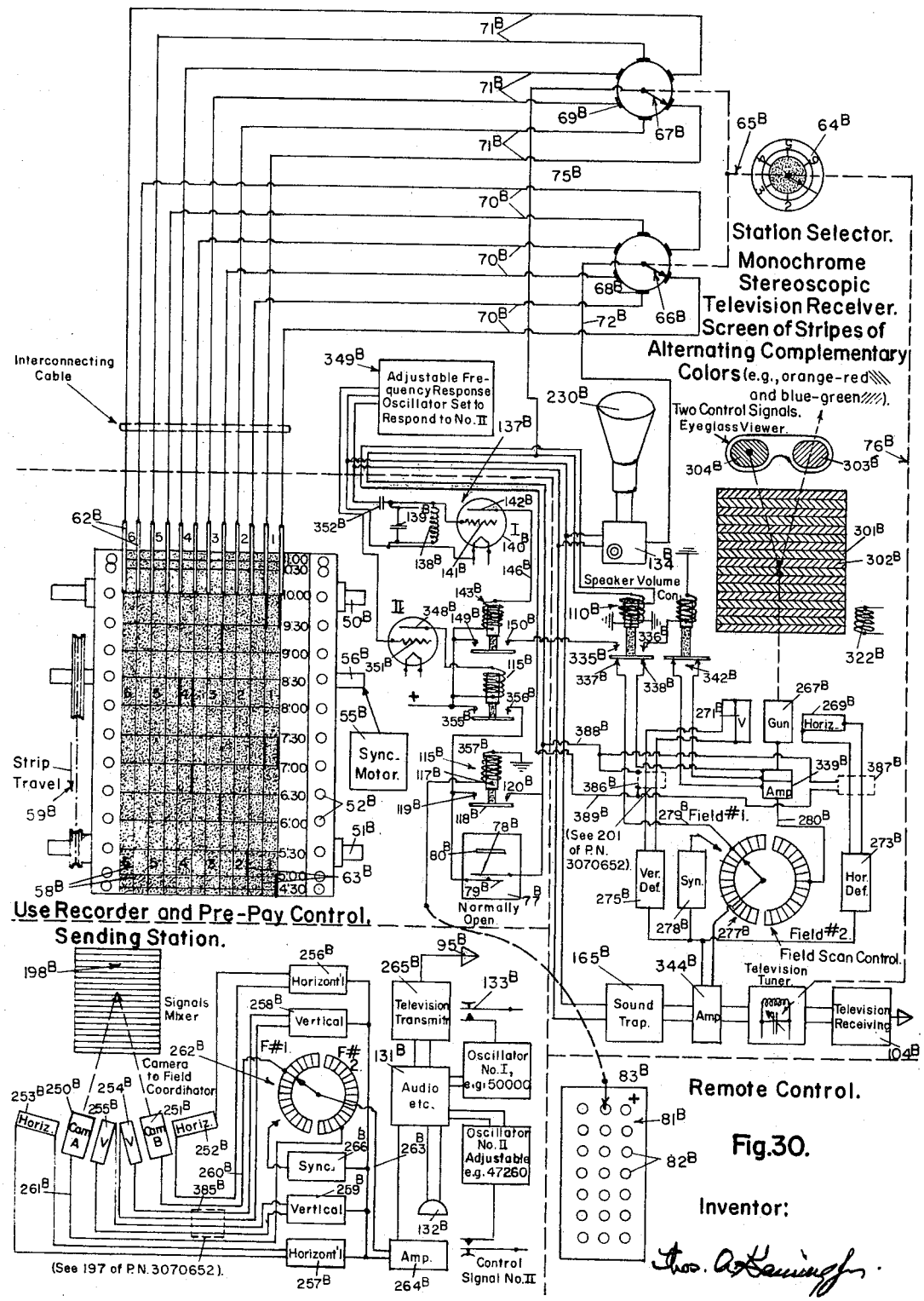

Dec. 12, 1967  T. A. BANNING, JR  3,358,079
STEREOSCOPIC TELEVISION INCLUDING MEANS TO
SELECT EITHER THREE DIMENSIONAL OR TWO
DIMENSIONAL RECEPTION
Filed Aug. 2, 1963  11 Sheets-Sheet 11
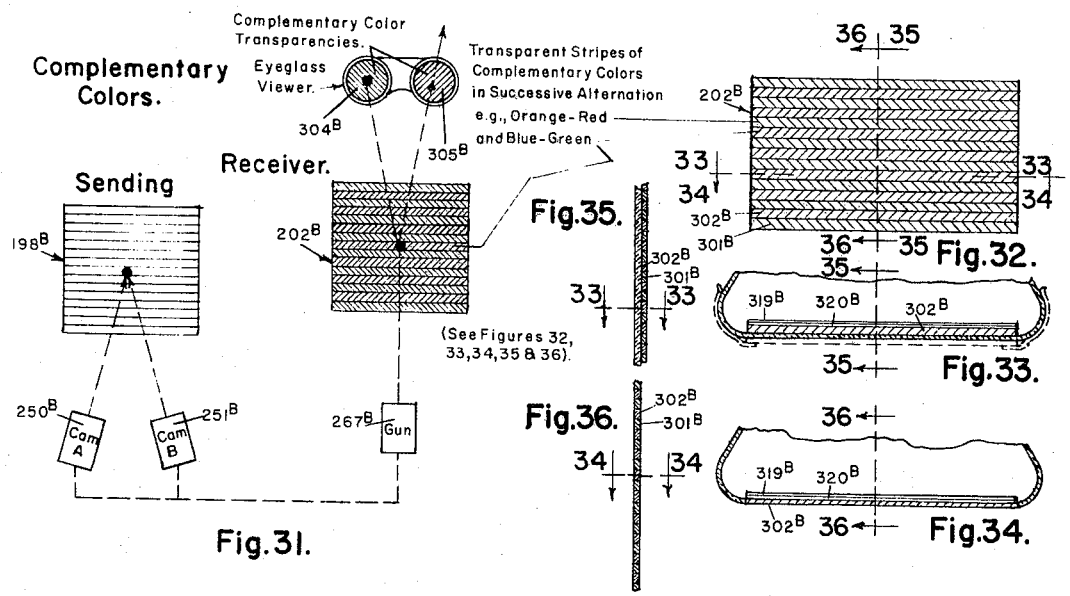
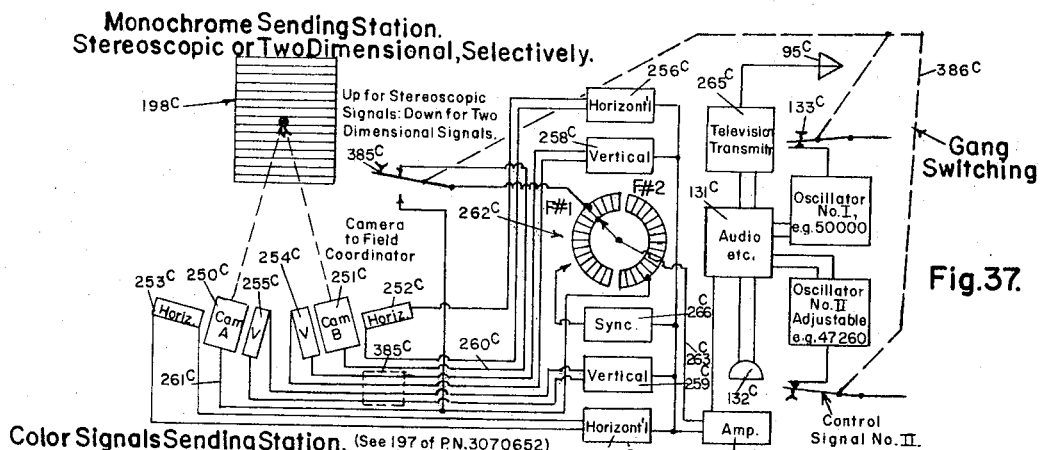
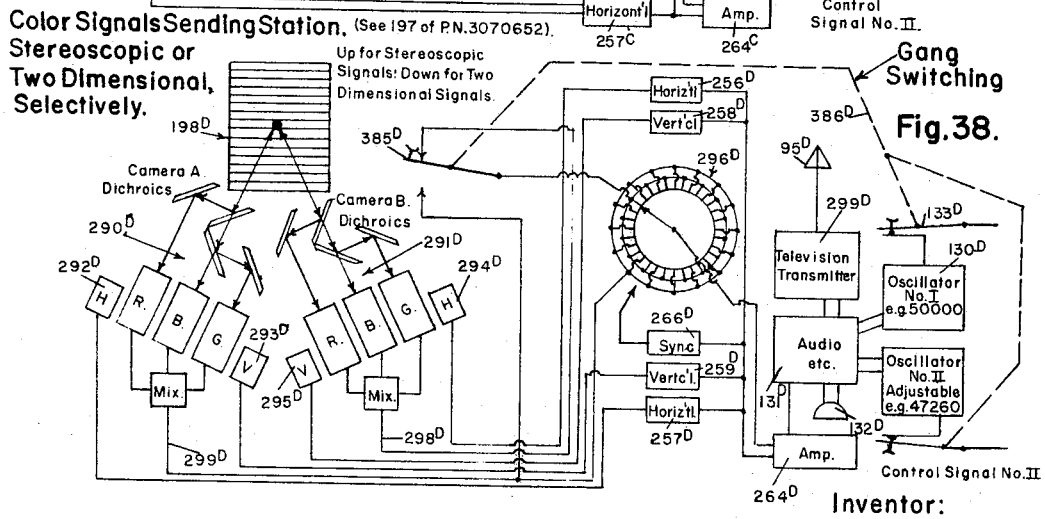
Inventor:
Thos. A. Banning Jr.

United States Patent Office

3,358,079
Patented Dec. 12, 1967

3,358,079
STEREOSCOPIC TELEVISION INCLUDING MEANS TO SELECT EITHER THREE DIMENSIONAL OR TWO DIMENSIONAL RECEPTION
Thomas A. Banning, Jr., 5500–5520 South Shore Drive, Apt. 1408, Chicago, Ill. 60637
Filed Aug. 2, 1963, Ser. No. 299,560
9 Claims. (Cl. 178—6.5)

This invention relates to improvements in stereoscopic television, and the like. By the term "stereoscopic" I contemplate the production on the viewing screen, and the viewing thereof, of images or replicas under conditions such that such replicas have a three-dimensional appearance, with the resulting perspective of the viewed replica, and the appearance of solidity of the viewed images. It is well understood that the production of stereoscopic viewing requires, in general, the correlated viewing of at least two replicas of the simulated object, such replicas being reproductions of viewing the simulated object from two points separated from each other a distance proper to examine the object from two angles, corresponding, more or less, to the examination of the object by the two human eyes, which are laterally separated from each other. When provision is made for individual examination of such two replicas by the two eyes of the observer, and when such individual examinations of the two replicas are produced simultaneously, or at such short intervals that the persistence of vision results in intermingling the two viewed replicas in the observer's mental processes, the desired simulation of the object is produced under the stereoscopically correct conditions to produce the intended result.

Accordingly, provision must be made for producing signals corresponding to viewing the object from two separated locations, such signals corresponding to the images of the object produced when viewed from such separated locations; for transmitting such signals to the receiver, in timed spacing such that the translated and viewed replicas will properly mingle in the viewing of the observer, and in proper spatial relationship that the desired result of stereoscopic viewing shall be attained. The hereinafter to be disclosed units and elements are constituted to attain these results.

It is now noted that for the production of the desired results two sets of signals are sent from the sending station, corresponding to the two spaced apart viewing locations, each such set comprising signals which may be translated by the receiver to produce a true replica of the viewed object as seen from the location of the corresponding "camera." The signals so transmitted are received by the receiver and are by it translated into a raster on the viewing screen. Such raster will then comprise the image corresponding to the sending camera's signals, and will thus be a true replica of the object as thus individually viewed by such specified camera. Provision is made for thus emitting the signals corresponding to viewings of both of the cameras; and correspondingly, provision is made for translating each set of signals into a raster corresponding to such set of signals, both such rasters being displayed on a common viewing screen. Conveniently both of the rasters are produced on a common viewing screen without need of reflecting either or both of the rasters from individual screens, to a single common viewing screen on which both sets of signals would be intermingled. The embodiments hereinafter disclosed are such that both of the rasters are directly produced on a common viewing screen, thus simplifying and consolidating the receiving equipment. However, it will presently appear that various of the novel features are not limited, in their operation and use to such a single viewing screen original translation but are equally applicable to the production of rasters on separate viewing screens in proper coordination. Thus, for purposes of simplicity and practicality of embodiment and use, I shall hereinafter describe various embodiments wherein the two rasters are properly intermingled and related and translated on a single viewing screen, to produce the desired end result, proper relationship of such two rasters to each other, both as to time and spatial relation, being provided.

Since the two rasters correspond to the signals from the two cameras which are examining the common object, it is also necessary to make provision whereby each raster will be individually viewed by its proper single eye of the observer, so that the physiological processes of the observer's viewing will be properly delivered to the brain processes for production of the desired end result. I have hereinafter disclosed several viewing arrangements constituted to produce this result. It is noted, however, that such viewing arrangements must include controls or relationships whereby the viewings transmitted to each eye are properly coordinated with the raster elements which should be viewed by such eye, and substantially without interference produced by the elements of the other raster. Furthermore, the viewings thus produced and delivered to the two eyes should be in controlled time spacings, and such time spacings should be small or frequently enough to ensure that the effects produced by the two sets of viewings shall be commingled by the persistence of vision, to produce the desired stereoscopic effect. I have hereinafter disclosed embodiments meeting the foregoing requirements.

It is to be noted also, that since the two sets of signals emitted by the two cameras are distinct to the two angles or locations of viewing the common object, the delivery of the viewings to the two eyes must be controlled to match the two sets of signals emitted corresponding to the two camera examinations of the common object. I have made provision for procuring this result in the embodiments hereinafter disclosed.

According to present conventional television operations as specified by the FCC the television raster comprises 525 horizontal scans divided into two sets or fields; these comprise a first or main field of 263 scans or lines and a second or interlace field or 262 scans or lines, located between the lines of the first field. Each is scanned 30 times per second, thus producing 60 fields per second, overall. The viewer thus sees 30 double fields or frames per second. The number of scans per second for both fields is 15,750.

Conventionally a synchronizing pulse or signal is emitted harmoniously with the completion of each field of signals at the sending station, and the receiver is provided with means to receive such synchronizing signals and to restore the electron beam of the kinescope to a selected corner of the raster (conveniently the upper left-hand corner) upon receipt of each such synchronizing signal. Thus such synchronizing signals comprise a means to control the viewing elements for discrimination of the viewing of the observer, between the two fields, to ensure viewing of the raster corresponding to one field by one of the observer's eyes, and viewing of the raster corresponding to the other field by the other eye of the observer. Under this arrangement each eye will be allowed to see one complete field of 263 (or 262) scans, comprising a complete field, without interruption; the two eyes being thus permitted to view a complete field at a time, with intermixing of such viewings of the two eyes 30 times per second. This is well above the accepted rate needed to avoid flicker; in fact the physiological effect will be that corresponding to 60 poses per second, since the effects of persistence of vision will also affect the overall viewing. I have hereinafter disclosed embodinents constituted to produce such synchronized relation between the signals emitted by the sending station, and the viewing arrangements for the two eyes.

It is to be noted, however, that it may sometimes be found desirable to effect alternation of the viewings between the two eyes at greater rate than just explained. For example, it may be desirable to scan each line with shift of the viewing from eye to eye at completion of successive linear scans. The present disclosures are such that such alternative arrangement may be used if desired. It is noted however, that in such case the viewing interval for each eye (scanning of one line) would be substantially $1/15{,}750$ second instead of $1/30$ second. I have, in the hereinafter disclosed embodiments included means whereby such high rate of alternations between the viewings of the two eyes may be secured.

It is also here noted that I have hereinafter disclosed an embodiment for production of the stereoscopic translation and viewing of the raster which does not require change of the viewing apparatus to discriminate between the rasters produced in correspondence with the signals from the two cameras. With this embodiment the discrimination between the raster elements for the two fields occurs naturally on a simple light-translation principle. This will be disclosed hereinafter.

It is also noted that the provisions for discrimination between the two rasters are applicable equally to so-called monochrome television and to color television. Accordingly, I have provided means to produce the stereoscopic effects for both monochrome and color television operations.

The embodiments hereinafter disclosed are fully compatible in the sense that they enable production of the stereoscopic effects in conventional forms of television receivers, including the conventional circuitry thereof, provided that the signals emitted by the sending station include two sets of the signals corresponding to the two viewings of the object, and that such two sets of the emitted signals correspond to two conventional sets of scan productions in the receiver. Such two sets of receiver scan productions may be either the scans for production of the two rasters (the two fields), or may be two sets of the linear scans. Accordingly the usefulness of the presently to be disclosed embodiments is made to include conventional receivers presently in use, substantially without need of modification or change of such presently used receivers.

In the scanning of the viewed object for production of the two sets of emitted signals, the signal strengths emitted corresponding to each scan of each camera vary in strength during the scan, corresponding to varying intensities of reflected light from successive elemental areas of the viewed object. When a complete field is thus scanned by one camera, followed by scan of the next complete field by the other camera it is evident that any movement of either the viewed object or the cameras during the scanning operations will result in emission of signals by the two cameras corresponding to the successive positions of the object during such scannings. Usually such movements during such intervals of time will be comparatively small, so that the two rasters produced, corresponding to the two fields thus signalled may be commingled for production of the desired stereoscopic effects, without blur of the image produced during the viewing of such translated and viewed stereoscopic translation. It is again noted that under presently accepted practice there are produced 30 of the rasters corresponding to each field, per second, so that the movement of the viewed object between successive raster productions will be small. If desired, the alternations of camera viewing may be produced corresponding to the scanned lines, instead of the full fields, thus greatly reducing the possibility of blur since with such arrangement, the time intervals between successive scans will be of the order of $1/15{,}750$ second.

It is noted that, according to one embodiment hereinafter to be described each eye will continuously see the raster, but will discriminate between scans to be viewed by such eye, and scans to be viewed by the other eye, with substantially complete non-viewing of improper scans by each eye. According to this embodiment no physical movement of any portion of the viewing equipment is required so that the rate of change of viewings by the two eyes with production of the desired discrimination, is substantially unlimited. This embodiment of the viewing means is also one which does not require any electronic or like controls to produce the needed discriminations.

Included in the discriminating means of the viewers are several specific embodiments. These include a rotary type shutter rotated in synchronism with the translations of the two sets of scans which correspond to the two sets of signals from the sending station. It will be shown that this type of discrimination produces a semi-shut-off of the set of signals which does not correspond to that set presently being translated. Various other embodiments of the discriminating equipment include the use of polarized light controlled elements for selecting either the shutter open or the shutter close condition. It will be shown that by the use of polarizing principles, embodiments of the discriminating means may be produced which will ensure substantially instantaneous shutter effects between shutter open condition, and shutter closed condition; or slower effects which are, however fast enough to ensure the desired discrimination between the two rasters which correspond to the two sets of signal translations on the viewing screen.

Another embodiment hereinafter disclosed includes the use of primary polarizing elements in the viewing screen of the kinescope. These primary polarizing elements include one set, the polar axes of all of the elements of such set extending parallel to each other and in one direction in a plane parallel to the viewing screen, such set corresponding to one raster; and including a second set, the polar axes of all of the elements of such set extending parallel to each other and in another direction in a plane parallel to the viewing screen, and conveniently at right-angles to the polar axes of the first set, such set corresponding to the other raster. Accordingly, when the first raster is being produced by signals translation, and in registry with the first set of polarizing elements, the transmitted light from such raster's elemental areas will be polarized in one direction; and when the second raster is being produced by signals translation, and in registry with the second set of polarizing elements, the transmitted light from such raster's elemental areas will be polarized in a direction (preferably at right-angles to the axes of the elemental areas of the first set). Then, by viewing the screen through a set of eye-glasses, the window for one eye comprising a transparent sheet polarized in direction parallel to one set of polar axes, and the window for the other eye comprising a transparent sheet polarized in direction parallel to the other set of polar axes, light from the polarizing elements whose polar axes are parallel to the polar axis of one such window will be admitted and passed through such window to the corresponding eye; but light from the polarizing elements whose polar axes are nonparallel to the polar axis of such window will be refused passage or shuttered out. Thus, as one set of such polarizing elements of the viewing screen, corresponding to one raster, is illuminated by the excitations produced by the electron beam within the kinescope, producing an illuminated raster, such raster will be viewed by the proper eye, and as the other set of such polarizing elements of the viewing screen, corresponding to the other raster, is illuminated by the excitations produced by the electron beam within the kinescope, producing the other illuminated raster, such raster will be viewed by the other eye. Thus the desired descrimination of viewing by the two eyes will be produced by the simple expedient of holding or wearing a simple set of eyeglasses before the eyes of the viewer.

In the practice of the above explained embodiment it will be found convenient to so operate the equipment that the first raster is produced by excitation of the first field of scans, with the second raster produced by excitation of the second or interlace field of scans; the polarizing elements being aligned with the lines of scan; and the polarizing elements for the first field of scans having their polar axes all facing in the same direction, and the polarizing elements for the second field of scans having their polar axes all facing in the same direction, being a direction different from that of the direction of the polar axes of the first field. The viewing eye-glasses needed for good viewing of such embodiment will have the polar axes of their two transparent windows extending substantially parallel to the polar axes of the corresponding polarizing elements of the two sets of scan lines of the viewing screen. For perfect "opening" of the shutter effect produced by the above embodiment the polar axes of the two eye-glass windows should be parallel to the polar axes of the polarizing elements of the kinescope screen; but it will presently appear that a rather substantial lack of such parallelism will produce a comparatively small reduction of the "opening," measured as a percent of the maximum light transmission which may be transmitted with perfect alignment of the two polar axes. This explanation will appear hereinafter when the light transmissibility through two of the polarizing elements is more fully revealed in its relation to the present problems.

When a rotary shutter is included in the viewing elements, such as a rotary opaque alternating cut-off element, the passage of the cut-off section of such unit, through the path of light between the viewing screen and the observer's eyes, it will be found that the area of opening produced as the opaque shutter element moves across such light path rises from zero to a maximum, and then descends again to zero when complete cut-off is attained. Accordingly, the visibility of that raster then being revealed rises from zero to a maximum (full shutter opening), and again falls to zero as the raster comes to its completion. Since the raster produced by the successive scannings of scan lines beginning at the top of the viewing screen and descending to the bottom of such screen, is also simultaneously being viewed through a window opening which commences its opening movement at the beginning of the raster's production, and which opening then rises to a maximum (full open) condition, and then reduces to zero (opening closed) as the bottom of the raster is reached, it is evident that the illumination permitted to pass such shutter is variable, also rising from zero at the top of the raster, to a maximum value in the central portion of the raster, and then falling to zero at conclusion of the raster production. Accordingly, such an arrangement, while serving to largely produce separation of the rasters viewed by the two eyes of the observer, nevertheless is deficient in the sense that a perfect viewing cannot be attained. The overall illuminations of the upper and lower portions of the picture will be deficient, and emphasis will be drawn to the central portion of the picture where full illumination occurs. As will hereinafter appear there will also be produced a mixing of the viewings of the two eyes, so that perfect separation of such viewings is not attainable by such a rotary shutter arrangement. Nevertheless the viewed picture will present a very considerable amount of stereoscopic effect and will be acceptable when perfect stereoscopy is not required.

The foregoing conditions will also be found to occur when the viewing of the two rasters is produced through eyeglass elements which incorporate two sets of polarizing sheets in each window, one sheet of each set being stationary, and the other sheet being continuously rotated so that its polar axis regularly rotates from a position at right-angles to the polar axis of the stationary sheet, to a position of parallelism with the polar axis of such stationary sheet, thus executing a light transmissability from zero to full value, and back to zero during a half-rotation of the rotatable sheet. The operations of such viewing embodiments will be described in full detail hereinafter.

It is however, noted that when using such a rotatable polarizing sheet in connection with a stationary polarizing sheet, provision may be made for fast transition of the rotatable sheet from its shutter close condition to its shutter fully open position, and with pause at such fully open position, followed by fast return to its shutter fully closed position. By such means it is possible to attain a condition approximating full open condition during the production of the corresponding raster, and approximating full closed condition during production of the noncorresponding raster. Means to secure these results will be described hereinafter.

The rotatable or rockable embodiments of shutters in the path of the viewed raster require physical drive for their operations, synchronized with the production of the corresponding rasters, since such arrangements require physical movements of shutter elements. I have also herein disclosed means to effect shutter operations electronically, and without need of physical movements of shutter elements. One such embodiment includes use of the "Faraday effect" which is well known under the name of "Magneto-Optic Shutters." Shutters embodying this effect depend for their operation on the fact that the semipolarized light transmitted from a single polarizing element may be twisted from its thus polarized condition, through an angle depending on the strength of a magnetic field having its lines of force extending parallel to the direction of such semipolarized light, and the distance which such semipolarized light travels along such field. Then, by providing another polarizing sheet at the receiving end of such magnetic control, the polar axis of which other sheet is nonparallel to the polar axis of the originally stated polarizing sheet, the semipolarized light may be brought into registry with such second polar axis, and thus be made transmissible through the second polarizing sheet. With this arrangement, when the magnetic field is extinguished by termination of the exciting current which produces it, the semipolarized light coming from the first polarizing element will not be admissible through the second polarizing sheet, to the full strength of such semipolarized light. If the second polarizing sheet has its polar axis at right-angles to the polar axis of the first polarizing sheet, full extinguishment of the semipolarized light beam will occur, so that the shutter is in its fully closed condition. (This statement is true with the exception of a minute portion of any blue wave lengths which may be included in the light beam, and only a minute portion of such blue will be passed through the second polarizing element.)

By including such a magneto-optic element in each of the eye-glass window locations, and by providing for energizing the two magnetizing elements alternately, the one shutter element or the other may be made light transmissible. Such transmissibility will continue only so long as the magnetic field is sustained. By provision of proper circuitry between the synchronizing signals and such magnetic elements, the two magneto-optic units may be alternately excited for production of the desired light transmissibility harmoniously with production of the two rasters. Such arrangements are disclosed hereinafter.

In connection with the above arrangement it is also noted that the "opening" and "closing" of the magneto-optic shutters are extremely fast, occuring within the order of $10^{-8}$ seconds. Accordingly, full opening will be produced with such a shutter at the instant of starting each raster, and such full opening will continue until completion of the corresponding raster, with full shutter closing at that instant. In the foregoing statement the term "full opening" or "full closing" will be understood to define that shutter condition of opening or closed condition for which the unit has been designed. This will be fully exlained hereinafter, when reference is had to certain curves relating the angle included between the polar axes of the two polarizing sheets of a shutter, to the percentage of illumination which will be passed when such two axes are brought into exact parallelism. It will then be made apparent that, due to the nature of the polarizing effects only slight changes of light transmission through the pair of shutter polarizing elements will occur, near the condition of right-angularity of the two polar axes, and near the condition of parallelism of such polar axes. For this reason the "shutter closed" condition may, to practical ends, be a position somewhat less than the right-angular position; and the "shutter open" position may, to practical ends, be a position somewhat earlier than attainment of full parallelism of the two polar axes.

In Letters Patent of the United States, No. 2,755,334, issued to me July 17, 1956 I have disclosed and claimed arrangement whereby the signals necessary for stereoscopic television operations may be produced by use of two or more cameras viewing the object from different positions, so that such signals correspond to the viewing of the object from slightly different positions and angles of observation, and for intermixing such signals in regular and repetitious order for transmission to a receiver unit as stereoscopic translatable replicas of the object. Said Letters Patent also discloses the above for the production and intermixing of such signals in the case of production of color television.

In Letters Patent of the United States, No. 3,070,652, issued to me December 25, 1962, I have disclosed and claimed arrangements whereby the time of use of selected television programs may be recorded for various purposes. In both of such earlier Letters Patent I have disclosed means whereby the selected television programs may be received and translated in either of two qualities of reception at the choice of the user of the equipment, with provision for making it necessary either to produce a record of the use of such chosen quality reception, or to effect payment therefor before receiving the desired program. It is now noted that when the signals are emitted for the condition of producing a stereoscopic reception and translation, two sets of the signals are emitted corresponding to the two cameras which view the object. To produce the steroscopic translation to which I have hereinbefore referred both of such sets of signals are used, producing the two replicas on the viewing screen of the kinescope, with the provision for discriminating the viewing of the two replicas by the two eyes of the observer. Thus, when such stereoscopic quality of reception is desired, both of such sets of signals are brought into use in the receiver, and their translations are both used.

In the present case I have made provisions for selecting and translating only one of the sets for production of only one of the replicas without need of prepayment therefor, or for production of a record of such use for accounting purposes. Thus I have herein included provisions for selecting and translating the stereoscopic signals of a stereoscopically produced television program, with prepay or recording the use thereof; or for translating only one of the sets of signals, without need of making such prepay or recording. Several arrangements are herein disclosed which embody the foregoing features.

In said patent, No. 3,070,652 and in a divisional case based thereon, Serial No. 245,277, filed December 17, 1962, I have included provision for emitting a special control signal with the emitted television signals, which control signal is emitted during the emission of signals for a special program which is to be of quality requiring prepay or recording of use. I have also, in such earlier cases, included means in the receiver constituted to respond to the frequency of such special signal, and then to disable the reception until the user of the receiver shall either make prepay or provision for production of the record of use during reception of such special quality program; but such disablement extends only to the special quality reception, leaving the receiver still in condition to receive the emitted program in a quality of reception and translation of less desirability, without prepay or production of the record of the use.

The response of the receiver to such special control signal is produced by provision of an oscillator unit in the unit, tuned to the frequency of the special signal, and resonant thereto to produce reactions which shall disable the receiver as far as intelligible reception of the special quality program is concerned, but still leaving the receiver in condition to receive and translate the program at a lesser quality of translation. It may be desirable to change the frequency of such special control signal from time to time, to avoid improper receptions of special programs through use of receivers which have been illegally altered to receive the special quality programs without prepay or production of the record of use. When the emitted control signal is thus changed it becomes necessary to correspondingly alter the resonant frequency of the tuned element of the receiver in order to bring such receiver into condition for reception of the special quality programs until at a later time the emited control signal shall again be changed. In the present case I have included a resonant responsive unit which is so designed and constructed that an element thereof may be readily removed and sent to a control station, to be surrendered, whereupon a substitute element will be sent to the user of the receiver in question. Such substitute element may then be readily inserted into the resonant responsive unit of his receiver, to restore the operativeness thereof, for reception and response to the newly announced control frequency. The value of such new control frequency may be retained secret to the control station, so that unauthorized persons may be prevented from improper substitutions into the user's receiver. The details of this unit will be described hereinafter.

I have also herein disclosed improved arrangements of circuitry in the receivers which are constituted to respond to control frequencies in order to make effective the disablement of the reception and translation of the higher quality reception. Such improved circuitry includes the provision of two control signals emitted from the sending station concurrently with the emission of the television signals. One of such control signals serves, when received by the receiver, to disable a portion of the receiver circuitry to prevent translation of the special quality program, and the other control signal serves, when received by the receiver, to condition circuitry so that by prepay or remote control operation the translation for the higher quality reception may be produced. Certain advantages incident to this dual control signal embodiment will appear hereinafter.

A prime object of the invention is to provide means whereby a conventional receiver, provided with a single electron gun, and with means to control such gun for production of the two conventional rasters (one being the first raster, and the other being the interlace raster), may be readily converted for reception of the stereoscopically emitted signals from the sending station, for production of a stereoscopic picture to the viewing of the user; such conversion, when using the arrangements herein shown in FIGURES 4, 7, and 12, 13, 14, 15 and 16 being made possible by use of a removable screen set against the front or outside face of the kinescope viewing screen, and used with a simple form of eyeglasses to alternately block out from each eye, viewing of the raster produced and intended for viewing by the other eye. When this arrangement is to be incorporated into receivers intended for the further objective of requiring prepay or remote control for reception of the stereoscopic picture (when emitted), minor alterations in the circuitry of such conventional receiver are made, and the various control elements and their circuitry are contained in a convenient housing or box, located at a convenient location, and connected to the conventional receiver by simple multiple conductors or cables. The arrangement shown in the above defined figures is one embodying polarizers; but I have also herein disclosed, and shall describe a similar arrangement, in which, instead of using the polarizers and the principles of polarizing light, provision is made for using two sets of transparent elements (such a stripes) of colors complementary to each other, together with eyeglass viewing means, also embodying glasses for the two eyes, one of one complementary color, and the other of the other complementary color; such arrangement being shown in FIGURES 30, and 31, 32, 33, 34, 35 and 36 hereinafter to be described in detail.

When using either such polarizing light arrangement or such complementary color arrangement, as well as other embodiments hereinafter illustrated and described, for reception of stereoscopic signals, emitted by two cameras viewing the object from different angles, with production of the two rasters to correspond to such two camera signals, the proper and desired stereoscopic effect will be produced to the viewer. However, if such two rasters, produced according to the signals of the two cameras viewing the object from different positions or angles, are viewed without the provision for stereoscopic viewing, the resulting picture viewed by the viewer will be somewhat blurred or unclear, since both of the viewer's eyes will receive both of the rasters. Accordingly, it is desirable to make provisions such that when the picture is being emitted as a conventional two dimension picture only a single, selected one of the cameras shall produce signals which are received and translated to the viewing of the viewer. When the program is of the higher grade or prepay classification such that it shall be received stereoscopically with prepay, but as a two dimensional picture without prepay, the two rasters are emitted by the two cameras in either case (prepay or not prepay), but when received without prepay, only one of the rasters is translated to the viewer. Accordingly, the total illumination produced on the viewing screen is only that due to such one raster. I have, accordingly, made provision such that under these conditions of non-prepay of such "prepay" program, the single raster thus translated and produced to the viewer shall be amplified to largely or fully compensate for the deficiency above defined. It is noted, however, that under such single raster picture production the detail or definition of the picture thus produced will be downgraded. Nevertheless the picture thus produced without prepay will be an intelligible translation and acceptable as being received without prepay.

When the picture being produced is a two dimensional picture, only a single camera being used for production of the emitted signals, it is desirable to make provision for emssion of both of the rasters' signals from such single camera, to thus ensure production of the picture according to conventional specifications of the FCC, and to ensure production of the received picture under conventional standards of brightness and detail or definition. By so doing the receiver will produce, for the case of emission of conventional two dimensional pictures, a two raster (main and interlace) picture under two dimensional conditions, without need of change of the receiver which is also capable of receiving and translating the stereoscopic picture two camera signals. When so used the polarized stripe unit (or the complementary color unit) may be removed from the face of the conventional kinescope, and the received and translated picture may be viewed as a two dimensional picture without need of using the eyeglasses or other special viewing equipment.

I have provided simple switching means in the sending station for producing emission of the signals from the two cameras in proper succession to produce the two rasters, when the operation is to include the stereoscopic feature; or for causing both rasters' signals to be emitted according to signals from a single one of the cameras. Since the special control signals to cause certain of the control operations incident to the prepay operation to be produced in the receiver, are not needed or used when the above explained two dimensional operation is in progress, I have also disclosed gang switch arrangements whereby the production of such control signals is terminated during the time the single camera, two raster, two dimensional operation is in progress, and for restoring the control signals' operation when the two camera, two raster, stereoscopic operation is in progress. This feature of the sending station equipment is usable in connection with various of the receiver embodiments hereinafter to be described.

Other objects and uses of the invention will appear from a detailed description of the same, which consists in the features of construction and combinations of parts hereinafter described and claimed.

In the drawings:

FIGURE 1 shows schematically, one embodiment of my present invention, including a sending station producing television signals based on the scanning of an object by two cameras, with provision for interlacing such signals and emitting them; together with means to produce a single control signal emitted with such television signals, and means to emit a synchronizing signal to be received by the receiver for control of the operations of the prepay or remote control equipment, and for enabling discrimination between television signals for production of the first raster and for production of the second raster, of the stereoscopic translation and picture production; together with the receiver which includes provision for producing the rasters, and provision for synchronizing the translations with the operations of the sending equipment; together with means to control the delivery of the two raster produced pictures to the two eyes of the observer in proper relationship; and including means to control the viewing of such pictures either according to the stereoscopic principle or the conventional two dimensional principle, with means to provide for prepay or remote control operation when the stereoscopic reception is produced; and this figure also shows the provision of recording elements to make a record of the time of use and to identify the sending station from whose equipment the program is being received;

FIGURE 2 shows an arrangement similar to that of FIGURE 1, but modified to include provision for emitting two control signals from the sending station when the special stereoscopic (or other) program is being emitted; and also shows provision for control of the reception of such program for reception and translation of the received signals, and for reception of the two control signals and use thereof for ensuring pre-pay or remote control when the stereoscopic translation is to be produced, and for enabling reception of the signals needed for conventional reception and translation into a picture according to conventional operations when prepay or remote control is not used;

The showings of both FIGURES 1 and 2 are based on conventional monochrome picture translation;

FIGURE 3 shows an arrangement similar to that of FIGURE 2, but with provision for emission of the signals for color picture operation, with provision for stereoscopic translation and provision for properly viewing the two rasters by the individual eyes of the observer;

The showings of FIGURES 1, 2 and 3 each include a two gun kinescope arrangement, with provision for delivery of the one raster by one gun, and delivery of the other raster by the other gun;

FIGURE 4 shows another embodiment similar to that of FIGURES 2 and 3, but with provision for production of the rasters by use of a single kinescope gun;

FIGURE 5 shows in outline some of the principal elements shown in FIGURES 1, 2 and 3, with provision for discriminating between the two rasters and delivery of the produced pictures to the two eyes of the observer in proper synchronism for production of the stereoscopic effect, such discrimination being effected by a rotating shutter whose rotations are properly synchronized with the productions of the two rasters;

FIGURE 6 shows another embodiment similar to that of FIGURE 5, but with provision for effecting the discrimination of the viewing by the two eyes, by use of dual sheets of polarizing transparencies, with provision for fast rock of one of each pair of such sheets through needed angle of rock, to change the shutter effect between "open" and "closed" condition, according to the principles hereinafter described in detail; the back and forth rocking of the movable sheets being effected in synchronism with the display of the two rasters on the kinescope viewing screen;

FIGURE 7 shows another embodiment similar to those of FIGURES 5 and 6; but FIGURE 7 shows the elements thereof for the schematic showing of FIGURE 4, being a single kinescope gun embodiment; and in both of FIGURES 4 and 7 the embodiment includes provision of narrow bands of polarizing transparency in line with the scan lines of the viewing screen; alternate such bands of polarizing transparency having their polar axes parallel to each other but extending in one selected direction, and the intermediate bands (corresponding to the interlace scans) having their polar axes parallel to each other but extending in a direction other than the polar axes of the first set of such bands; and this figure also includes viewing and discriminating means in the form of eye-glasses having windows of polarizing transparency, with the polar axis of one window parallel to the polar axes of one set of the scans bands, and the polar axis of the other window parallel to the polar axes of the other (interlace) set of scans bands;

FIGURE 8 shows another embodiment similar to those of FIGURES 5, 6 and 7; but in FIGURE 8 the means to discriminate the viewings of the two eyes between the two rasters includes eye-glasses having dual sheets of polarizing transparencies, with provision for continuously rotating one sheet of each window in synchronism with the production of the two rasters on the viewing screen of the kinescope;

FIGURE 9 shows another embodiment similar to those of FIGURES 5, 6, 7 and 8; but in FIGURE 9 the means to discriminate the viewings of the two eyes between the two rasters includes viewing elements comprising "magneto-optic" shutters, with provision for magnetizing such shutters alternately according to the production of the two rasters on the viewing screen;

FIGURE 10 shows, on enlarged scale as compared to FIGURE 9, one of the magneto-optic shutter elements, with the axes of the two polarizing transparencies at its ends, crossing at an angle of substantially 90 degrees or less, according to the principles hereinafter disclosed;

FIGURE 11 shows an end view corresponding to FIGURE 10;

Figure 1:
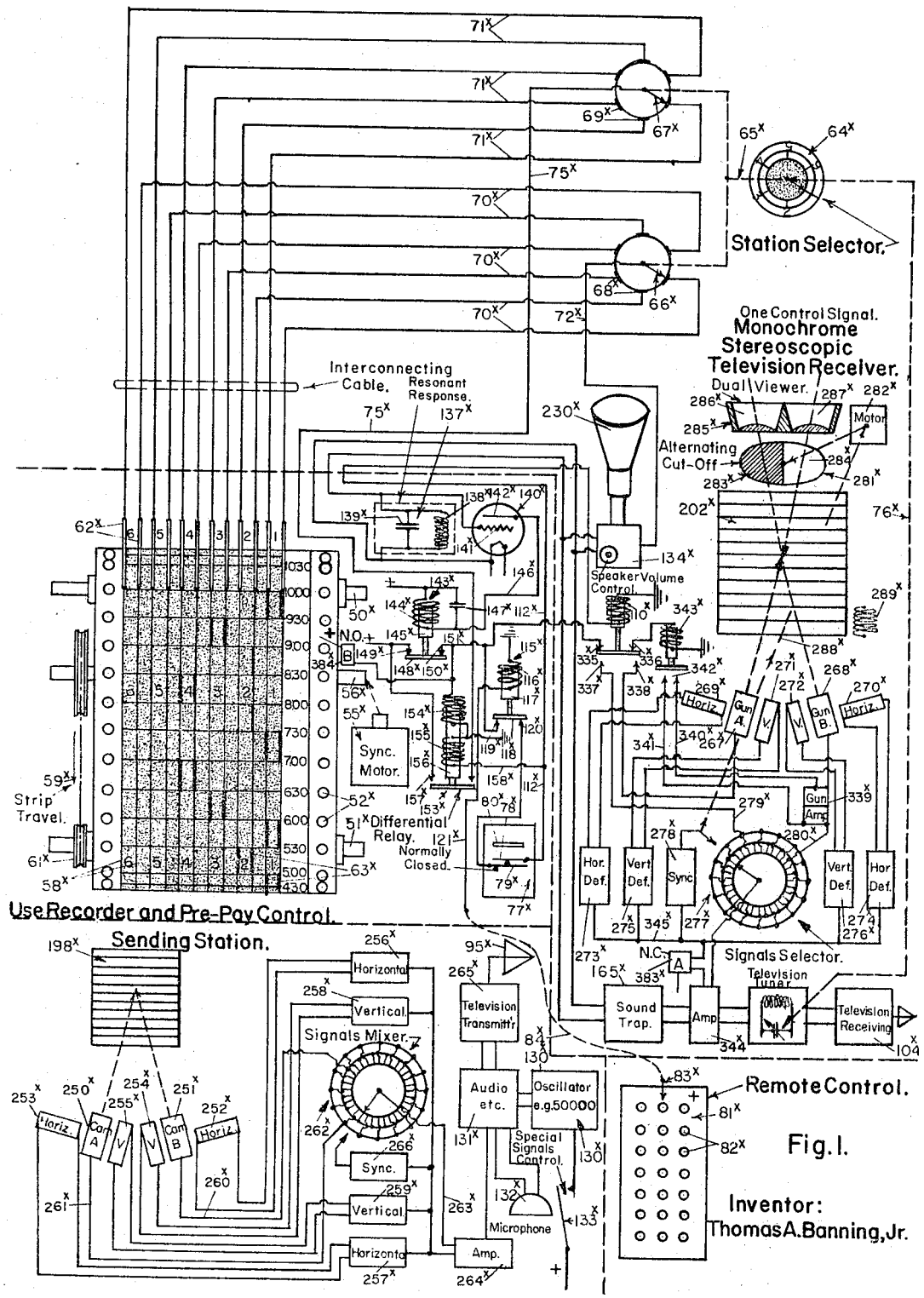
Figure 3:
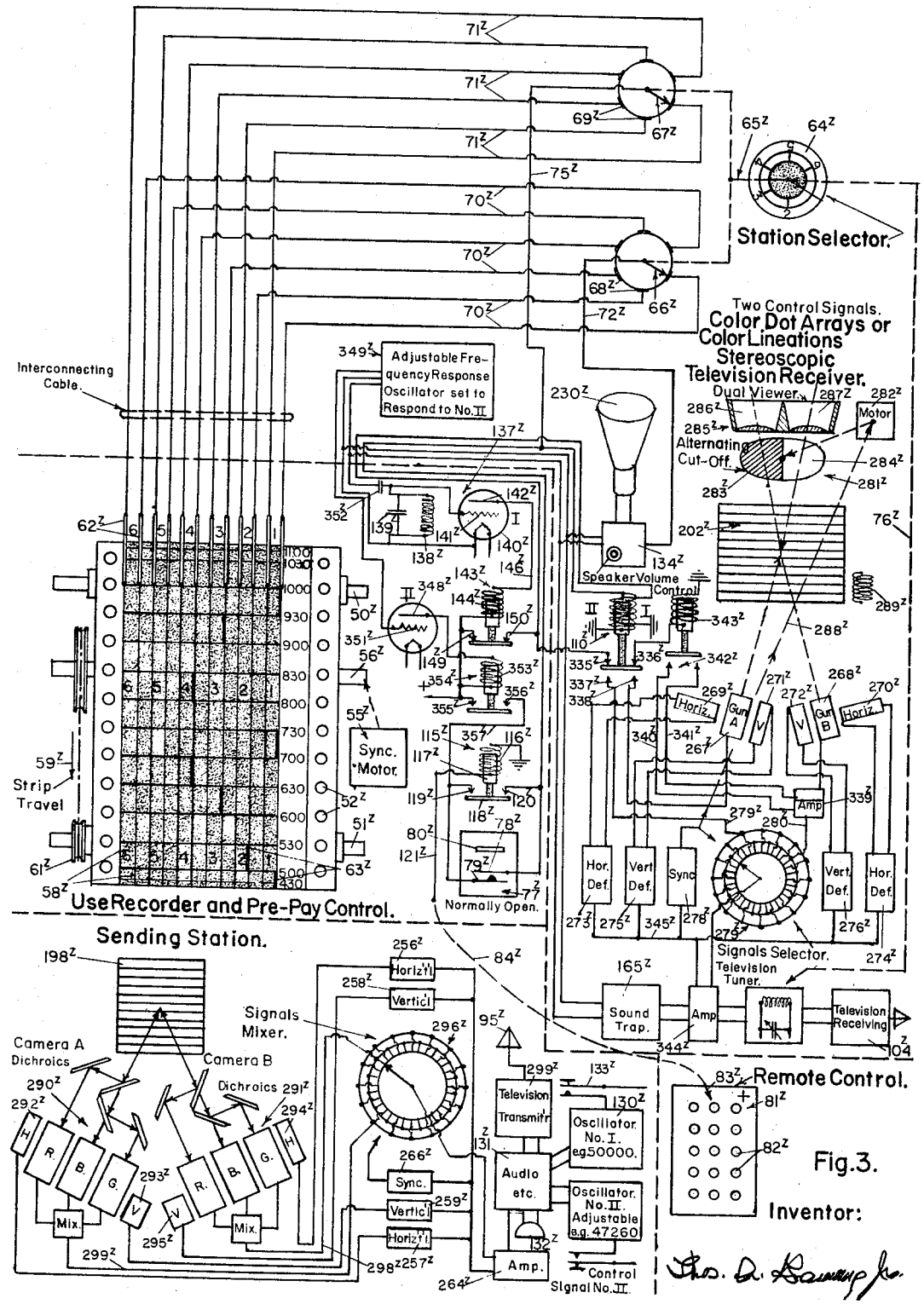
Figures 18, 19:
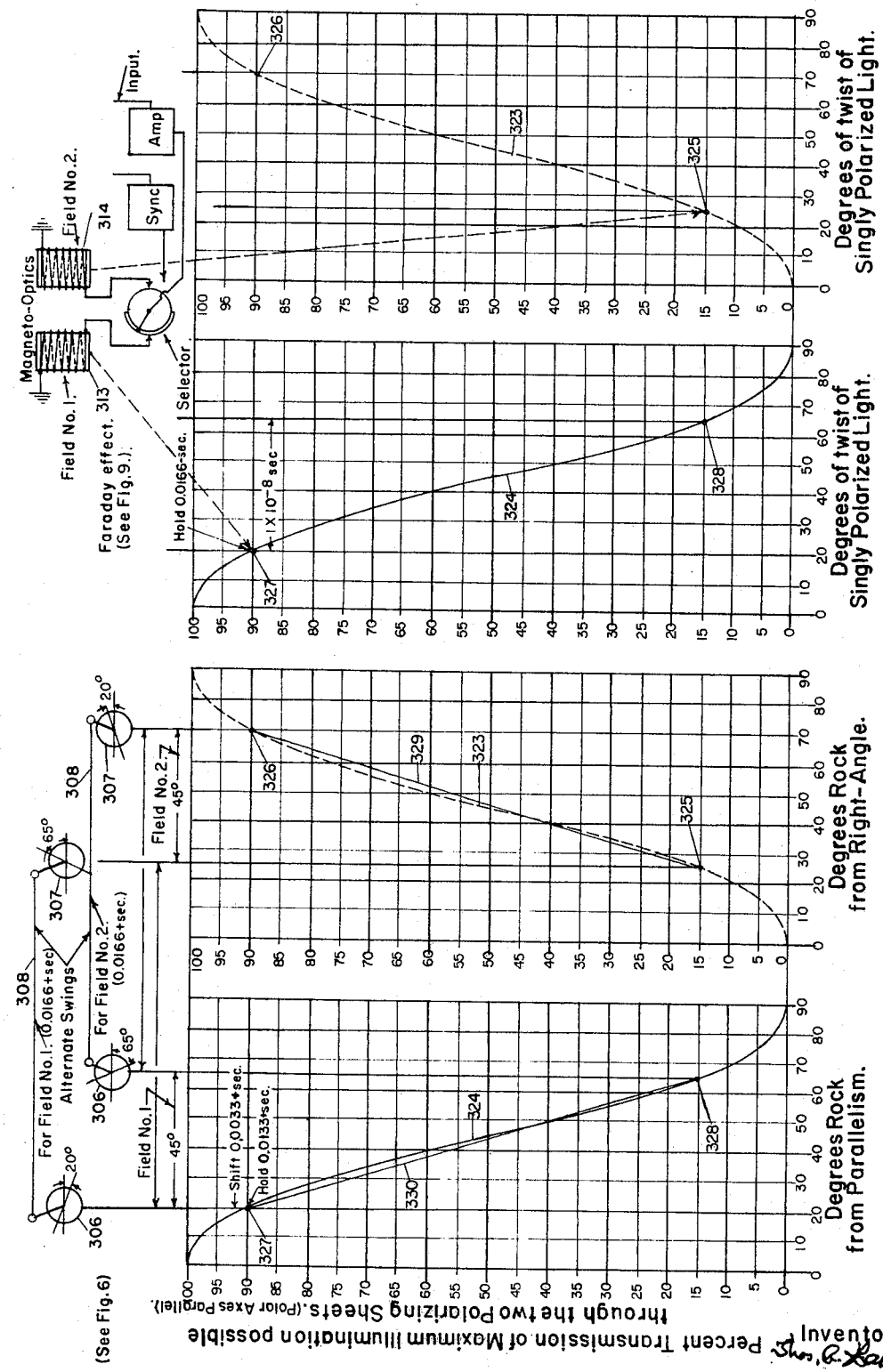
Figure 22:
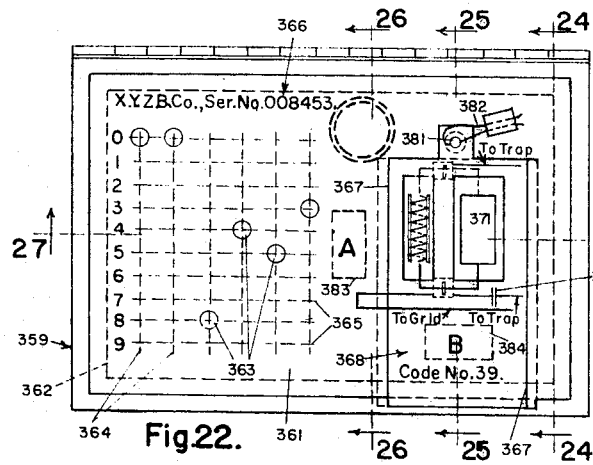
Figures 21, 24:
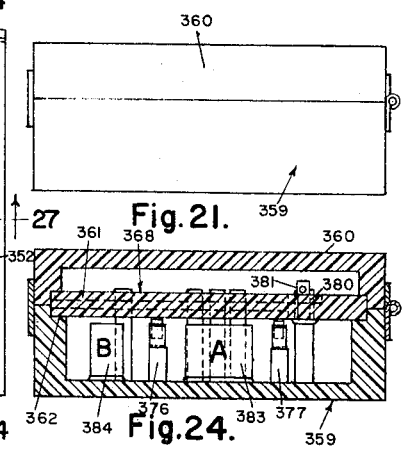
Figure 23:
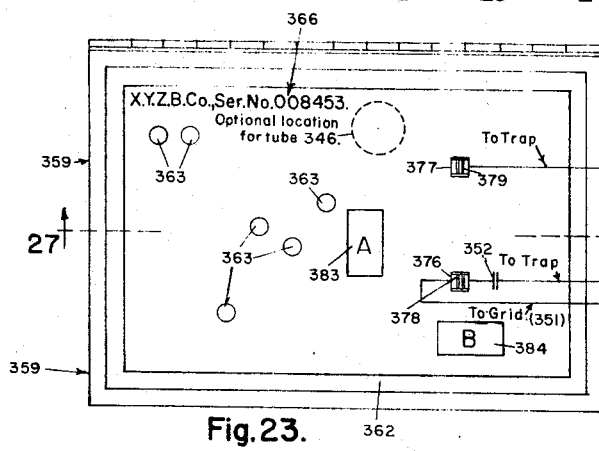
Figures 25, 26:
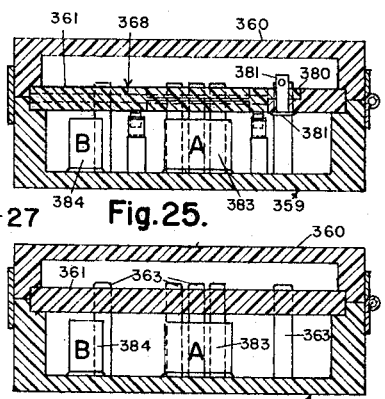
Figure 27:
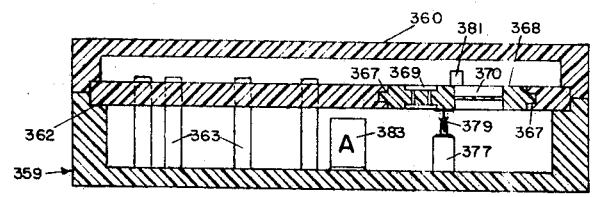
Figure 29:
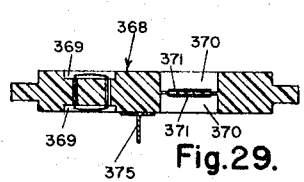
Figure 28:
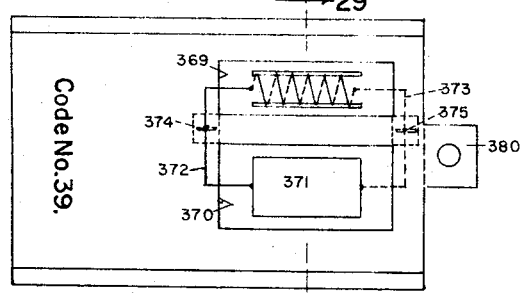

FIGURE 12 shows, on enlarged scale as compared to FIGURES 4 and 7, a face view of the viewing screen of the kinescope, when provision is made for semipolarizing the illumination delivered by each scan so that the illumination reaching the location of the viewer is semipolarized as it reaches such position; and this figure shows, by the hatching, that the polar axes of such polarizing scans extend alternately to the right and to the left, viewed as in such FIGURE 12, with the polar axes of alternate scans extending parallel to each other, and the polar axes of the intermediate scans also extending parallel to each other, but at an angle (e.g., substantially ninety degrees) to the polar axes of the first mentioned group of scans;

FIGURE 13 is a horizontal section taken on the line 13—13 of FIGURE 12, looking down; and this figure shows an embodiment in which the polarizing effect for each scan is produced by a narrow band or strip of the transparent polarizing material, secured against the inside surface of the viewing screen, and with the strips for the successive scans being placed close together and comprising a substantially continuous surfacing of the inside surface of the viewing screen; the electron beam excitable phosphor being deposited over the inside surface of such continuous surfacing with, if needed, a thin coating of transparent protective material placed on the inside surface of the polarizing strips, and between such strips and the phosphor coating; and this figure also shows, by dashed lines, an alternative embodiment in which the polarizing strips are secured together, edge to edge, to produce a continuous sheet from the strips, which sheet may then be removably set against the front surface of the viewing screen of the kinescope, and held in place by suitable clips as a detachable connection;

FIGURE 14 is a horizontal section taken on the line 14—14 of FIGURE 13, looking down, and this figure shows another embodiment wherein the strips or bands of the polarizing transparent material are connected together edge to edge, to provide a continuous gas tight sheet, which sheet is then set into the front opening of the kinescope, to produce the front enclosure of such kinescope, of gas tight quality, the phosphor being deposited on the inside surface of such enclosure, with the protective coating between the enclosure and the phosphor coating, if needed;

FIGURES 15 and 16 are vertical sections taken on the lines 15—15 and 16—16 of FIGURES 13 and 14, respectively, looking in the directions of the arrows;

FIGURE 17 shows a set of curves plotted according to the percent of transmitted luminosity transmitted through a set of the transparent polarizing sheets, as the angle included between the polar axes of the two sheets is continuously changed from zero degree (full registry of the polar axes together (parallelism)), to successive positions for a full rotation of one sheet with respect to the other; such curves being provided corresponding to continuous rotations of one sheet of each pair, corresponding to the two eyes of the observer; it being noted that 100% transmission corresponds to 100% of the luminosity which is transmitted through the pair of sheets when their polar axes are exactly registered; the polar axes of the stationary sheets of the two pairs, being indicated by the hatching in the two directions; and the rotatable sheets of the two pairs being identified, the one by continuous line, and the other by dashed line;

FIGURE 18 shows curves of such transmitted luminosity for the relatively rotated positions of the two rotatable sheets, when such sheets are rocked back and forth through an angle of not more than 90 degrees, the sheets of the two pairs being shown, the one by full lines, and the other by dashed lines; and this figure shows, schematically, above the curves, how the rotatable sheet of each pair is rocked back and forth through 45 degrees (from a position of included angle of 20 degrees, to a position of included angle of 65 degrees), with change of percent transmissibility of luminosity through the pair of polarizing sheets; it being noted that such rock of only 45 degrees produces change of percent transmissibility from 90% to 15%, being 75% change with 45 degrees rock;

FIGURE 19 shows curves similar to those of FIGURE 18, but with showing of magneto-optics above the curves for reference;

FIGURE 20 shows curves similar to those of FIGURE 17, but for the operation which includes a rotary disk, one-half of which is opaque, the other half being clear;

FIGURE 21 shows an end elevation of a unit which houses an oscillator, comprising the inductance and the capacitor in parallel, which oscillator is tuned to respond to a selected frequency of control signal; which oscillator unit includes a removable plate carrying the oscillator elements, and may be removed for substitution of another like plate which is provided with an oscillator responsive to another frequency of control signal;

FIGURE 22 is a plan view of the unit shown in FIGURE 21, with the cover turned into open position to reveal the plate just above defined;

FIGURE 23 shows another plan view of the unit of FIGURES 21 and 22, with such plate removed from the housing;

FIGURES 24, 25 and 26 are cross-sections taken on the lines 24—24, 25—25 and 26—26, respectively, of FIGURE 22;

FIGURE 27 is a longitudinal section taken on the line 17—17 of FIGURE 22, looking in the direction of the arrows;

FIGURE 28 is a plan view of the oscillator plate, removed from the housing;

FIGURE 29 is a cross-section taken on the line 29—29 of FIGURE 28, looking in the direction of the arrows;

FIGURE 30 shows an embodiment similar to that shown in FIGURE 4; but in FIGURE 30 use is made of stripes in or on the face of the kinescope viewing screen, transparent and alternately of two complementary colors; together with an eyeglass viewer which is also provided with windows of transparent complementary colors corresponding to the colors of the stripes;

FIGURE 31 shows a view similar to that shown in FIGURE 7, but corresponding to the showing of FIGURE 30;

FIGURES 32, 33, 34, 35 and 36 show views similar to those of FIGURES 12, 13, 14, 15 and 16, respectively, but with use of the transparent complementary color stripes instead of the polarizing transparent stripes of the former figures;

FIGURE 37 shows a sending station similar to that shown in FIGURE 30, but provided with switching arrangements whereby when desired the signals corresponding to both rasters may be produced by control of a single camera, whereas when stereoscopic signals are to be emitted, such switching means is moved to a position enabling such stereoscopic signals to be emitted; and this figure also shows gang connections between such switching arrangement and the switches by which the control signals are activated or nonactivated; and FIGURE 38 shows a sending station similar to that shown in FIGURE 3 (for color signals emission), but provided with the switching means similar to that shown in FIGURE 37 for enabling control of the signals produced by the two cameras, according to the one camera operation or the two camera (stereoscopic) operation, as desired, with ganging of such switching means with the switches for the two control signals.

Reference first to FIGURES 1, 2, 3 and 4, shows that I have in such figures shown schematically, embodiments of four general arrangements including various of the features of invention already referred to. In each such showing I have included in outline the basic elements of a sending station equipped to emit two sets of television signals corresponding to a like number of rasters. Included in each such showing are two viewing cameras, corresponding to such rasters; each camera being constituted to generate or control emission of television signals for the corresponding raster. Each such raster may include a large number of cross scans. Thus it is evident that provision may be made for emission of the television signals for all of the cross scans of one raster (e.g., the main field), followed by emission of the television signals for all of the cross scans of the other raster (e.g., the interlace field). In such case the receiver must be provided with means to translate all of the cross scans for the first field in a continuous succession, with provision for permitting viewing of all of the interpretations of the cross scans of such group of scans by a first eye, and forbidding viewing of all such interpretations of such cross scans by the second eye; followed by translation of all of the scans of the second field with provision for permitting viewing of all of the interpretations of the cross scans of such second group by the second eye, and forbidding viewing of all such interpretations of such cross scans by the first eye. Under this "full field" operation the viewing interval for each group or field would be 1/60 sec. (under present FCC specifications). It is also evident that the permitted viewing by each eye would be 1/60 sec., followed by permitted viewing of the other eye for 1/60 sec. and with intervals of 1/60 sec. of nonviewing by each eye.

Alternately, the sending station may be provided with means to emit the television signals for each scan as a group, with provisions for producing and emitting the television singals for the successive scans by the two cameras alternately. Under this arrangement the television signals emitted for picture elements of every alternate scan will be based on the viewings of one camera, and the television signals for picture elements of the intermediate scans will be based on the viewings of the other camera. Thus the television signals received and translated by the receiver corresponding to the successive scans will correspond to the television signals from the two cameras alternately; and the translations should be received by the two eyes of the observer alternately. This will require permitted viewing by each eye during the translation of a single scan, with forbidding of viewing by the other eye during the translation of such scan; and with permitted viewing of the intermediate scan translations by the other eye with viewing by the first eye forbidden during translation of the intermediate scans. Since, under present FCC rulings the scans are produced at the rate of 15,750/sec. it is evident that the above defined scanning and translating and viewing scheme will require provision for permitted viewings of 1/15,750 sec. duration, with intermediate forbidden intervals also of 1/15,750 sec. Means are hereinafter described whereby the alternate "openings" and "closings" of the viewing "shutters" may be produced at such high rates.

FIGS. 1, 2, 3 and 4 illustrate arrangements by which the foregoing operations may be produced, and will be described in sufficient detail hereinafter. It is also noted that the arrangements shown in said figures include provisions for enabling certain controls of the receptions of the programs to make possible operations whereby it shall be necessary for the user of the receiver to make prepayment, or to notify a central station, when such user desires to receive special programs for which payment is required, if he desires to receive such programs in their highest degree of quality, while allowing such user to receive such programs under a reduced quality of reception without payment therefor. I shall first describe such figures in sufficient detail to reveal the operations directly relating to the production of stereoscopic reception; and shall thereafter make such further descriptions as may be needed to disclose the operations directly related to the "prepay" or "remote control" uses. It is here noted, however, that various of the elements to be described are the same as or similar to corresponding elements shown in various figures of Letters Patent of the United States, No. 3,070,652, previously referred to herein. As to such elements common to such earlier case the numbering of such elements in the drawings of the present case are the same as in the earlier case, but carry suffixes other than shown on like numerals of the earlier case. Accordingly, in some instances it will not be necessary to describe such elements in full detail, nor to detail the complete functioning thereof.

In FIGURE 1 the two camera units $250^x$ and $251^x$ are shown focused on the common object $198^x$ so that such cameras view the object from different angles and locations. Each such camera is provided with the horizontal and vertical deflection means for producing the horizontal scans at successive vertical positions, according to conventional practice. These horizontal and vertical deflection producing elements are indentified as $252^x$ and $253^x$ for the two cameras, and $254^x$ and $255^x$ for the two cameras, for the horizontal and the vertical deflections, respectively. The controls for such deflection producing means are shown at $256^x$ and $257^x$ (horizontal), and $258^x$ and $259^x$ (vertical), respectively. The television signals from such cameras are delivered over the lines $260^x$ and $261^x$ to a "Signals Mixer" unit $262^x$. This unit is controlled by suitable means to cyclically transfer the television signals in the form of two groups (e.g., rasters) from the scans of the two cameras to a common line 263$^x$ by which they are transferred to an amplifying unit 264$^x$. Thence the signals are transferred to the unit 131$^x$ where the audio signals from the microphone 132$^x$ are mixed into the chain of signals, thence passing to the television transmitter 265$^x$, and finally to the antenna 95$^x$. An oscillator 130$^x$, activated under control of the switch 133$^x$ is also shown, such oscillator when activated feeding a predetermined frequency into the unit 131$^x$, thus incorporating a "control" signal into the system for transmission by the antenna 95$^x$. This control signal will be considered presently.

The signals mixer 262$^x$ is driven cyclically under control of the synchronizing unit 266$^x$ to receive the signals coming from the two cameras over the lines 260$^x$ and 261$^x$ and deliver such signals in the form of two alternating groups of signals, to the common line 263$^x$. Thus, if the equipment is intended to produce the two groups of signals as signals corresponding to complete rasters (first field and interlace field), such mixer will connect the line 263$^x$, first to the line 260$^x$ (camera 251$^x$) during the interval of a camera scanning operation over the complete field (first field), and then to the line 261$^x$ (camera 250$^x$) during the succeeding interval of a camera scanning operation over the complete field (interlace field), then repeating as above defined, alternating between the two fields of scan. Thus the television signals emitted by the antenna comprise the two groups in alternation, each group corresponding to a complete raster, and requiring the time interval for production of the corresponding number of cross-scans 263 or 262. If the equipment should be designed to include only a single scan in each group, the unit 262$^x$ would be designed for sending to the line 263$^x$ the signals for single lines of scan, coming alternately from the two cameras, and at greatly increased frequency and decreased intervals of sustained signals. Accordingly, it will be understood that the showing of a considerable number of cross connections between the circular conductors of the unit 262$^x$ is not intended to represent or limit the equipment to a corresponding number of scans or groups per cycle.

The receiver unit of FIGURE 1 includes two electron guns, identified as "A" and "B," respectively, for ready reference; and these guns are served by the conventional horizontal and vertical deflection controls, 269$^x$ and 270$^x$, (horizontal deflections), and 271$^x$ and 272$^x$, (vertical deflections), respectively; the guns being identified as 267$^x$ and 268$^x$, respectively. The television signals received are processed in conventional manner by the deflection controls 273$^x$ and 274$^x$ (horizontal), and 275$^x$ and 276$^x$ (vertical). The synchronizing signals emitted by the sending station are processed and used by the receiver for various synchronizing purposes such as the conventional synchronizing of starts of successive frames (usually comprising the two fields), and thus ensuring proper scan operations, both horizontal and vertical deflections.

This receiver also includes a "Signals Selector" unit. This unit is constituted to discriminate between the two groups of received television signals which correspond to the two camera viewing locations, and to deliver the proper television operations to the two guns selectively, in manner to cause said guns to emit their electron beams to the excitable target surfaces for production of the two rasters, respectively. Thus, during production of the first raster (first field) the proper signals will be delivered to the gun 267$^x$, and during production of the second or interlace raster (field) the proper signals will be delivered to the gun 268$^x$. To the above end the operations of such unit 277$^x$ are under control of the synchronizing unit 278$^x$, the Signals Selector unit being numbered 277$^x$. The lines leading from the Signals Selector to the guns 267$^x$ and 268$^x$ are identified as 279$^x$ and 280$^x$, respectively. These lines include certain additional control elements to be hereinafter described, together with their functions.

The viewing screen on which the translated picture elements are displayed is shown at 202$^x$. Since the embodiment shown in FIGURE 1 is for monochrome reception and display, both of the rasters produced by the two guns are for monochrome display, it being noted that conventionally each complete field is produced without interruption, followed by production of the other or companion field without interruption. In such case both of the units 262$^x$ (Signals Mixer of the sending station), and 277$^x$ (Signals Selector of the receiver) shall be of harmonious structure and operation, so that the television signals originating from the camera 250$^x$ shall be displayed as one raster, and the television signals originating from the camera 251$^x$ shall be displayed as the other raster, without intermingling of such displays in the two rasters. It is also again noted that each such raster may comprise a complete field, or may comprise a single scan. In each case the rate of production of full "Frames" shall be according to the rules of FCC, presently, 30/sec., being fast enough to ensure good viewing without flicker.

Having thus produced and displayed two sets of rasters, the one corresponding to viewings of one camera, and the other corresponding to viewings of the other camera, it remains to disclose means whereby the one set of rasters shall be viewed by one eye only, of the observer, and the other set of rasters shall be viewed by the other eye only. Thus, shutter means must be provided between the viewer's eyes and the viewing screen of the kinescope, such shutter means being constituted and operable to discriminate between the rasters of the two sets, admitting viewing by each eye, of rasters belonging only to that set which corresponds to such eye. Several forms of such shutter arrangements will be revealed hereinafter; and in each of FIGURES 1, 2, 3 and 4 I have shown such shutter means.

The shutter means shown in FIGURE 1 comprises a rotating circular shutter plate 281$^x$, journalled to rotate on its center as an axis, and driven at constant speed by a small motor, conveniently a synchronous motor 282$^x$. One half of such rotating shutter is opaque as shown by the hatching, the other half being clear and transparent. These halves are shown at 283$^x$ and 284$^x$, respectively. The eye piece 285$^x$ is mounted directly behind such rotating shutter element, and includes the two pockets 286$^x$ and 287$^x$, spaced apart to correspond generally, to the spacing of the observer's eyes from each other. If desired, clear lenses may be seated into the bottom portions of such pockets for better viewing. It is noted that although such shutter element is shown as elliptical, it is in fact circular, but is shown in perspective for purposes of convenience of illustration.

In the shutter position illustrated in FIGURE 1 the opaque shutter section is shown in position to shut off viewing by the left-hand eye, with full open viewing by the right-hand eye. Accordingly, the right-hand eye is permitted to view the raster being displayed by the gun 267$^x$, but the left-hand eye is forbidden to see that raster display. Upon rotation of the shutter through 180 degrees, the positions of the opaque and clear portions of the shutter will be reversed, and viewing by the left-hand eye permitted with corresponding forbidding of viewing by the right-hand eye. It is evident that the rotations of such shutter must therefore be synchronized with the displays of the successive rasters on the viewing screen. Such synchronisms is assured by controls from the unit 278$^x$ as shown by the dashed line 288$^x$. It is now to be noted that with such a rotating shutter arrangement there is regular transition from the condition of full viewing by the right-hand eye, and full cut-off against the viewing of the left-hand eye, so that the processes of amount of viewing permitted or forbidden are transitional, and not sharp or sudden. I shall hereinafter discuss this condition of such a shutter arrangement as it affects the clarity and faithfulness of translation of the full picture in stereoscopic form. I shall also there disclose several other embodiments of shutter, some of which will produce a very fast and sharp transition between the conditions of full opening, and full closed; and another of which is based on a very simple principle of optics.

I have shown the calibrating solenoid $289^x$ adjacent to the viewing screen $202^x$ of FIGURE 1. This unit represents a conventional means for adjusting the position of the frame of the display, if necessary to ensure accurate viewing of each raster as displayed.

Figure 2:
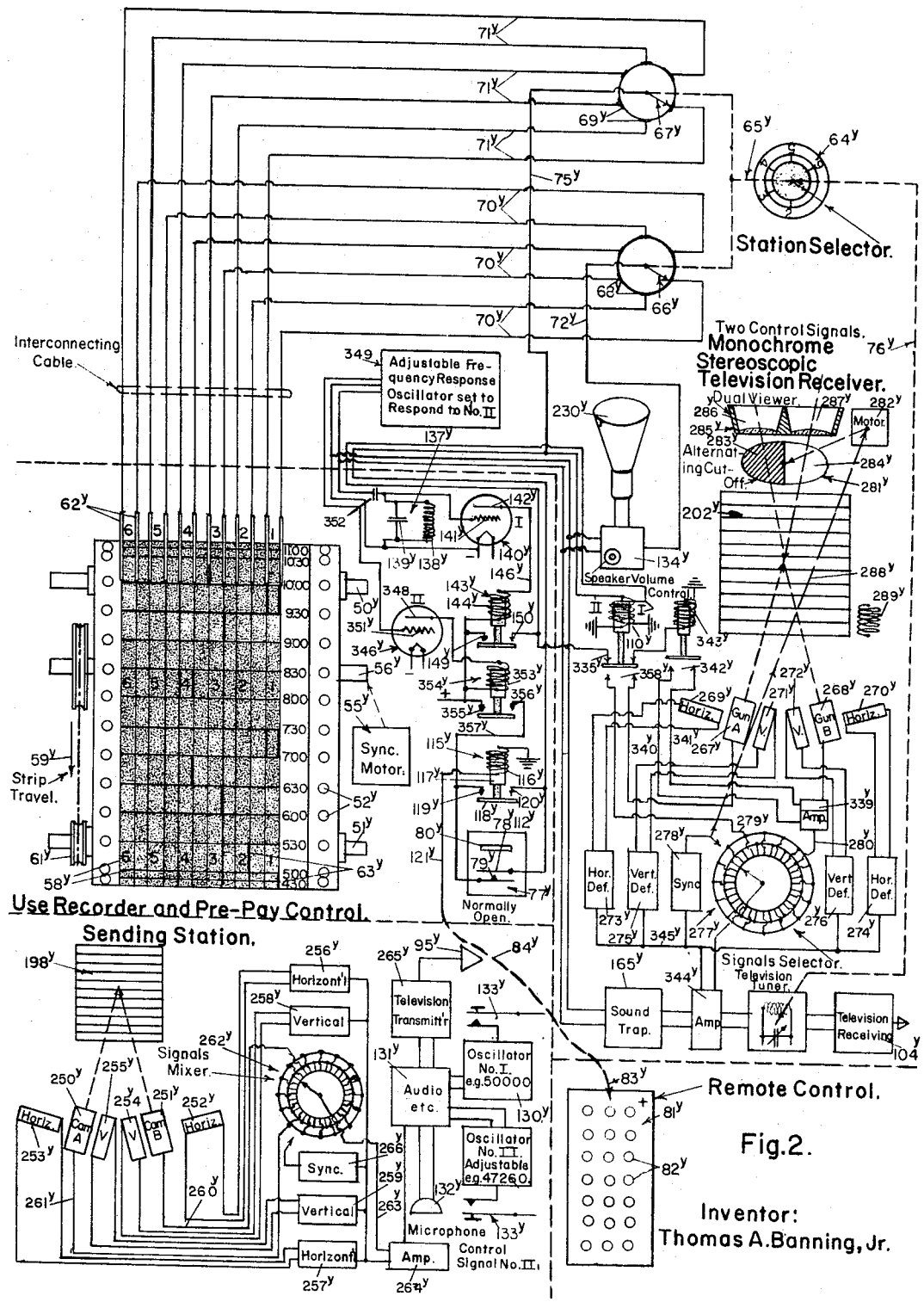

Reference to FIGURE 2 will show an arrangement the same as that just described for FIGURE 1, insofar as concerns the production and translation and viewing of the two rasters corresponding to the two cameras; but FIGURE 2 shows a prepay or remote control arrangement which includes two control signals emitted by the sending station when the higher quality program is being emitted, for which pay is required to produce such program on the viewing screen of the raster under full quality conditions. The descriptions of the controls used in connection with the pay programs will follow hereinafter, at which time both the single control signal arrangement of FIGURE 1, and the two control signal arrangement of FIGURE 2 (and FIGURES 3 and 4) will be described in detail. Accordingly, FIGURE 2 includes in its showings the same numerals as are shown in FIGURE 1 for corresponding elements, but with the suffix $y$ instead of $x$ as in FIGURE 1.

Reference is next made to FIGURE 3 which discloses the embodiment of the features of the present invention in a sending station, and in a receiver, for color television emission and reception and translation either according to the conventional three color dot array system or according to the full color scans system. The two cameras for viewing the common object from different locations are shown at $290^z$ and $291^z$ viewing the object $198^z$ from different angles. The conventional dichroics are provided for each camera to deliver the primary color effects to the signal producing elements of such cameras; and the conventional horizontal and vertical deflecting means for the two cameras are shown at $292^z$ and $293^z$, and at $294^z$ and $295^z$, for the two cameras, respectively. These color signals are transmitted to the "Signals Mixer" $296^z$ over the lines $297^z$ and $298^z$. This signals mixer is constituted to deliver the signals corresponding to each raster with alternation of the signals for the two rasters in alternation to the television transmitter unit $299^z$ in manner similar to the operations already explained for the embodiment of FIGURE 1. In this embodiment two of the control signals are introduced into the stream of signals emitted from the antenna $95^z$. This will be fully explained hereinafter.

It is unnecessary to describe this embodiment of FIGURE 3 in further detail, and the various elements of this embodiment which correspond to elements of FIGURES 1 and 2 are correspondingly numbered, but with the suffixes $z$.

Referring next to the embodiment shown in FIGURE 4, in this case provision has been made for production of monochrome translations on the viewing screen; but it will appear that the operational principles and features now to be described in this embodiment of FIGURE 4 are also usable in connection with production of color television operations.

In the present case I have shown the "Signals Mixer" $300^A$ as divided into two sections legended F#1 and F#2, respectively. These may correspond to the two rasters, each being a complete examination of the object through all of the scans of a Field, and the two fields being the first or main field, and the second or interlace field, already referred to. The signals are transmitted to the conventional antenna $95^A$, the desired control signals being introduced into the stream of signals, as will hereinafter appear.

Next, referring to the receiver unit, in this case the viewing screen includes laterally extending narrow strips of polarizing transparency, rather thin, and producing polarizing strips which correspond in width and number to the excitation scans produced by the sweeps of the electron beam. These strips are so set into or on the viewing screen that their polar axes in the successive strips extend at an angle to each other, as shown by the hatching of the successive strips in FIGURE 4. For convenience of identification the first set of strips carry the numeral $301^A$, and the intermediate strips carry the numeral $302^A$. These are also numbered as 1 and 2, respectively, corresponding to the first field and the second field, respectively. As will hereinafter appear, these polarizing strips may comprise a series set against the inside surface of the viewing screen of the kinescope, or against the outside surface of such viewing screen, or the front window of the kinescope may be formed of such strips, cemented together, edge to edge, in gas tight manner. Such alternate embodiments will also be referred to in connection with FIGURES 7, and 12 to 16, inclusive.

At this point I also mention that when such set of polarizing strips is set against the inside surface of the window of the kinescope, or when they constitute the window itself, the coating of excitable phosphor is deposited on the inside surfaces of the strips, so that excitations of the strips during travel of the electron beam horizontally, will produce the corresponding illumination very close to the polarizing strip in question; and thus the illumination transmitted through such strip will be semipolarized when viewed by the observer, either with or without the interposition of a viewing discriminator for controlling the delivery of one set of raster scans to view by one eye, and delivering of the other set of raster scans to view by the other eye. In other words, a monochrome picture (or a color picture, as the case may be) will be seen when looking at such viewing screen, either with or without the viewing discriminator. But if the viewing discriminator is used, only one set of scan lines will be visible, for the one raster, and the other set of scan lines will be visible, for the other raster. Due to the fact that such scan lines are based on viewing of the common object from slightly different locations, the combined picture produced by viewing the picture without eye discrimination, will be slightly softened with reduction of detail. However, such a viewing will be an acceptable translation for many purposes.

In FIGURE 4 I have shown the discriminator unit in the form of a pair of eye-glasses $303^A$, provided with the conventional window or lens openings $304^A$ and $305^A$, such eye-glasses to be worn by the observer in customary fashion during viewing of the stereoscopic translation. To effect such discrimination I have shown one of the windows of such eye-glasses as provided with a thin transparent sheet of polarizing material, with its polar axis parallel to the polar axes of one set of the strips, and the other window provided with another such polarizing transparency, but with the polar axis of such window parallel to the polar axes of the other set of strips. Accordingly, the following optical effects will be produced;

When one of the scans numbered 1 on $301^A$ is illuminated the semipolarized illumination transmitted through such strip will be admitted through that eye-glass window having its polar axis substantially parallel to the polar axis of such $301^A$ strip, but such illumination will be blocked by the transparency of the other eye-glass window, since the polar axis of such window is substantially normal to the polar axis of the illumination reaching such window. As long as strips of such group (all having polar axes parallel to each other) are successively illuminated by the successive scans (as when scanning the strips corresponding to the first field), the same eye of the observer will see the picture produced by such field of scans. Then, when the scans of the other set (corresponding, for example, to the interlace), are successively illuminated, the polarized strips for such scans will transmit illumination which is semipolarized at right-angles to the direction of the polarization of the first set of scans. Accordingly, such second set of scan illuminations (interlace) will be received and transmitted to the other eye of the observer but at the same time the first mentioned window will block such illuminations. Accordingly, one eye will see only the illuminations produced by scans of the first field, and the other eye will see only illuminations produced by scans of the second or interlace field.

It is here noted that such eye-glasses, worn by the observer need not be carried by the nose and/or ears of the observer with the polar axes of its windows accurately registered with the directions of the polar axes of the emitted illuminations, but a departure of some substantial degree from such condition of exact parallelism of the sets of polar axes will be tolerable, and will not result in more than a comparatively small reduction of the intensity of the illuminations reaching the observer's eyes, as compared with the intensity which would be received under the condition of exact registry of such polar axes. This will be further explored hereinafter.

It is also noted that when viewing the picture produced by such an arrangement as that shown in FIGURE 4, there will be reduction of the illumination transmitted through the polarizing screen when such screen comprises a permanent portion of the kinescope, as when it comprises strips of the polarizing transparency set against the inside surface of the window of the kinescope, or when the front enclosure of the kinescope itself comprises such screen composed of polarizing strips. If desired such reduction of transmitted illumination may be partially or wholly compensated for by provision for accelerating the electron beam during such operations. I have made such provision herein, and shall describe it in detail hereinafter.

It is also noted that such arrangement as that shown in FIGURE 4 is fully compatible with present specifications of the FCC, since use is made of the conventional fields of scans, and also the kinescope comprises a single gun unit. It will also be hereinafter shown that the polarized strip screen may comprise a self-contained unit, with the polarized strips cemented or otherwise connected together, the whole ensemble being of size to fit over the front window area, and provided with clips by which it may be readily attached to or detached from the front end portion of the kinescope. Such an arrangement is shown herein, and will be described hereinafter.

Next, referring to FIGURES 5, 6, 7, 8 and 9, I have therein shown in simple outline various arrangements of the principal elements of the embodiments hereinbefore described; and I have also in these figures illustrated additional means for producing the discriminations of the admittance of the illumination from the two groups of illuminations, to the two eyes of the observer, with simultaneous blocking of improper illuminations against reaching the observer's eyes. FIGURE 5 illustrates the discriminator as comprising the rotating semiopaque shutter embodiment. It is noted that although this type of discriminator is shown in FIGURES 1, 2 and 3, other types of discriminating unit now to be described may be substituted therefor in the embodiments and the operations produced by such figures.

In FIGURE 6 I have shown a discriminator unit comprising a set of eye-glasses having the two windows 306$^A$ and 307$^A$ set apart to correspond to the spacing between the eyes of the observer. Within each of these windows there is seated and secured a sheet of the polarizing transparency, these sheets having their polar axes parallel to the polar axes of the two sets of polarized strips (when used with the embodiment of FIGURE 4); but otherwise such polar axes of such two stationary polarized sheets are preferably at a considerable angle to each other, up to 90 degrees or right-angles to each other. Within each such window there is also rotatably mounted a second window sheet of the polarized material. These second sheets are connected together by a link 308, a small finger or lug extending radially outward from the rotatable carrier in which each such rotatable sheet is mounted, and such link being connected to both such fingers. This arrangement is such that as such link is rocked back and forth both of the rotatable sheets will be simultaneously rocked through an angle of not more than 90 degrees, and preferably about 45 or 50 degrees. Accordingly, when the link is in one position the polar axes of the two sheets of one opening will be parallel to each other (or close enough to pass the intended amount of illumination), while the polar axes of the two sheets of the other opening are crossed at right-angles (or at an angle sufficient to block substantially all of the illumination). Reference will hereinafter be made to the curves of FIGURES 17, 18 and 19 in reference to the needed amount of such rocks to produce the intended percentages of transmitted illumination, and the intended percentages of blocking. For the condition of parallelism of the polar axes of the two sheets when the link is shifted completely to one direction, and complete right-angularity of such two sheets when the link is shifted completely to the opposite direction (and opposite conditions of the polar axes of the other pair corresponding to the foregoing), it is seen that a comparatively small back and forth shift of the link is sufficient. Such back and forth link movements are produced synchronously with the translations of the two rasters, by suitable connections to the synchronizing elements of the embodiments of FIGURES 1, 2 and 3, as desired. In FIGURE 6 such back and forth rocks are produced by energizations of the solenoid 309, acting on the permanent magnet armature 310, by merely alternating the direction of current flow through such solenoid. The armature 310 is connected to the link 308 by the link 311. It is noted that by subjecting such solenoid to a comparatively strong excitation the movement in the corresponding direction will be very fast. Accordingly, with this arrangement each shift of the rotatable polarized shutter elements may be produced in a fraction of the time allotted for duration of each raster (e.g., $\frac{1}{60}$ sec.), so that most of such allotted time will elapse while the two rotatable shutter elements are stationary at one extreme of movement or the other extreme. This condition will be discussed hereinafter in connection with the aforementioned curves.

In the embodiment shown in FIGURE 8 I have made provision for continuously rotating the rotatable shutter elements of an eye-glass arrangement such as that of FIGURE 6. To this end the small synchronous motor 312 is drivingly connected to both of the rotatable carriers in which the rotatable shutters are mounted, such drive being conveniently produced by the worm and gear drive shown in such figure.

I have already made reference to the desirability of to driving the rotatable shutters as to produce an interval of rest for each such element at its terminal or rocking movement. It will be seen that small intervals of time are available for producing the alternate back and forth movements (when rocking is desired instead of continuous rotation). In some cases such intervals of rest will be very small. This would be the case, for example, when each "raster" comprised a single scan, since the rate of such scans is 15,750/sec. Under such high speed conditions the intervals of rest permissible would probably be of the order of hundred-thousandths of a second, or smaller. Such rates are beyond practicality. In FIGURE 9 I have shown an embodiment of the discriminating unit comprising magneto-optical shutters. These are shown at 313 and 314 for the two eyes. Each such shutter includes a cylindrical element 315 (see FIGURES 10 and 11 which are enlarged as compared to FIGURE 9) on which is wound a solenoid, represented at 316. A polarizing transparent sheet is set against each end of such cylinder element, with the polar axes of the two polarizing sheets at a crossing angle, such as 90 degrees (or somewhat less). These polarizing sheets are shown at 317 and 318, at the front and rear (eye) ends of the cylinder. Such cylinder is made of material having a comparatively high value of Verdet's Constant (such as dense flint glass, of which such constant is 0.0647). In use such unit is supported with one end in position to receive the arriving illumination, which then suffers a semi-polarizing effect as it passes through the first polarizing sheet 317, and travels longitudinally through the glass cylinder to the second polarizing sheet 318. Since the polar axis of such second sheet is at right-angles to the polar axis of the first polarizing sheet 318 such semi-polarized illumination suffers extinction by the second polarizing sheet. Thus the shutter is normally closed. However, according to the Faraday effect, the magnetic field parallel to the direction of the illumination through the cylinder, will twist the semipolarized illumination travelling towards the second polarized sheet 318, so that the illumination arriving at such second sheet 318 will be brought closer to parallelism with the polar axis of such second sheet than when such magnetic field did not exist. The amount of such twist produced is proportional to the length of the path between the two polarizing sheets, and proportional to the strength of the magnetic field which is produced.

With the foregoing arrangement, the polar axes of the two sheets 317 and 318 being at right-angles to each other, the shutter is normally "closed," and is opened by the development of the magnetic field. A converse arrangement may be used if desired, in which the polar axes of the two polarizing sheets are parallel to each other so that the shutter is normally open. In such case the twist of the semipolarized illumination proceeding from the sheet 317 to the sheet 318 will produce a closing effect proportinate to the strength of the magnetic field and the distance between the two sheets 317 and 318.

In FIGURE 9 I have shown a simple arrangement for producing alternate energization of the solenoids of the two magneto-optic units in alternation, and in proper synchronism with the raster operations. The time element absorbed by each opening or closing operation of such a shutter is of the order of ten millionths of a second, so such an arrangement will enable production of the shutter operations with substantially no loss of time during such operations, allowing substantially the full time of the raster operation for permitted viewing, and with substantially no cross effects between the operations of the shutters for the two eyes. This will be referred to in connection with the description of the curves previously referred to.

Referring next to FIGURE 7 and the companion FIGURES 12 to 16, inclusive. In FIGURE 12 I have shown a sheet composed of the numerous strips of polarizing transparency set and held together with the polar axes of the successive strips extending alternately to the right and to the left, at angles of substantially ninety degrees to each other. This figure is thus illustrative of the semi-polarizing unit to meet the requirements of the operation shown in FIGURE 4. These strips are of course of width the same as the distance between successive scan centers.

In FIGURE 13 I have shown such a unit as that of FIGURE 12 set into place against the inside surface of the kinescope viewing screen. In FIGURES 13, 14 and 15 the viewing screens of the kinescope are flat. When the features now being described are used in connection with a curved viewing screen such strips should be correspondingly formed so that their assembly will be of contour to seat evenly against all portions of the surface of the viewing screen.

With the strip assembly set and secured in place against the inside surface of the kinescope end, the coating or sheet of excitable phosphor 319 is produced on the inside surface of such strip assembly so that the elemental area of such phosphor target excited by the electron beam will produce its illumination directly against or very close to the corresponding polarizing strip. If desired or needed a thin coating of transparent protective material 320 may be produced on the inside surfaces of the polarizing strips before performing the phosphor coating operation, so that improper chemical reactions between the polarizing strips and such phosphor coating will be avoided.

In FIGURE 13 I have also shown, by dashed lines a modified embodiment in which, instead of locating the polarizing strip unit against the inside surface of the kinescope window, the phosphor coating may be applied directly to such surface according to conventional operations; and then the assembly of the polarizing strips may be set against the outside surface of the kinescope window or screen. In such case suitable spring clips such as shown at 321 may be provided for engagement with the edge portions of the kinescope front end, to retain the polarizing strip assembly in place removably, so that it can be readily attached to or detached from a conventional kinescope. In such case the polarizing strips should register with the scan lines for best operation. Accordingly, such registration may be produced by slight raising or lowering of the raster produced on the target, according to conventional practice. The solenoid 322 shown in FIGURE 4 represents such a raster adjusting unit.

Any parallax due to the front to back distance between the phosphor surface and the polarizing strip unit when such unit is set against the front surface of the kinescope window, as shown by the dashed lines in FIGURE 13 will be reduced or eliminated or materially reduced by holding the glass window of the front of the kinescope to a thickness as small as commensurate with sufficient strength to resist implosion due to the existance of the high degree of vacuum within the kinescope envelope and will also be substantially eliminated by viewing the picture from a position directly in front of the kinescope window. It is noted that when such polarizing strip unit is located within the kinescope as shown in FIGURE 13, or when such unit comprises the front wall of the kinescope, no appreciable parallax will be created since in both of such embodiments the polarizing strip unit is in direct surface engagement with the phosphor surface (except for the thin protective surfacing 320 when provided).

Reference is now directed to FIGURE 17 which shows graphical studies of the relation between changing values of the included angles between the two polarizing sheets. These curves are based on the fact that the transmissibility of illumination through such two sheets when their polar axes are in registry may be accepted as unity or 100%, that such transmissibility falls to zero when such polar axes are at right-angles to each other (minus a trace of blue component), and that for angular displacements between such parallelism and such normality, the transmissibility varies as the square of the cosine of the angle included between the polar axes. Thus each curve shown in FIGURE 17 varies between 0% and 100% during continuous change of the included angle between 0 and 90 degrees, the 100% constituting the transmissibility of illumination through the two sheets when their polar axes are parallel (the included angle then being zero). In this figure the full line curve 323 shows such transmissibility of illumination for one eye's viewing, and the dashed line curve 324 shows such transmissibility of illumination for the other eye's viewing, it being assumed that the polarized shutter for the first mentioned eye is fully "closed" at the beginning of the operations shown in such figure, and that the polarizing shutter for the second mentioned eye is fully "opened" at such instant of start. Accordingly, the dashed line curve descends from 100% to 0% during angular shift from zero to ninety degrees, while the full line curve ascends from 0% to 100% during that same angular shift. During continued angular shift from 90 degrees to 180 degrees, the full line curve descends to zero, and at the same time the dashed line curve ascends to 100%, completing a full cycle of the shutter operations during 180 degrees of angular change. During the next 180 degrees such operations are epeated, completing the full cyclic rotation of one of the polarizing sheets, while the other sheet remains stationary. This corresponds to the continuous full rotary operation shown in FIGURE 8.

The following comments are now pertinent respecting the shutter operations produced by such continuous rotary operation:

During the rotation between zero and substantially 22½ degrees from each terminus of such rotation (22½ degrees from closed shutter position, or 22½ degrees before full open shutter position) comparatively small change in percent illumination occurs; it being seen that the curve 323 rises from zero to substantially 13%, and the curve 324 falls from 100% to substantially 87% during such first 22½ degrees of rotation. Correspondingly small changes of percentage of transmitted illumination also occur during the rotation from 67½ degrees to the 90 degrees position. Thus, during a rotation of 45 degrees (from 22½ to 67½, represented by the points 325 and 326 on curve 323, and by the points 327 and 328 on curve 324), there has occurred a change in percent transmitted illumination of substantially 74% (between 13 and 87%). In other words, during one-half of the rotary movement there has occurred slightly less than three-fourths of the possible change in percent transmitted illumination. This fact will be further considered in connection with study of the curves of FIGURES 18 and 19.

When the continuously rotating type of shutter shown in FIGURE 8 is used the full changes between zero and ninety degrees of included angle must be considered; whereas when using a rocking back and forth type of shutter, a different condition is available, as will be presently disclosed.

Now examination of the curves of FIGURE 17 also shows that during the simultaneous rotations of the two shutter polarizing sheet of the embodiment shown in FIGURE 8 the curves of percent transmitted illumination cross at 45 degrees of rotation, and under the transmission of 50% illumination. It is also seen that transmissibility through the formerly "closed" shutter (curve 323) commences at the same instant that reduction of transmissibility shown by the curve 324 commences, and that transmissibility through the now opening shutter continues to rise with continued rotation, while transmissibility through the now closing shutter falls. Accordingly, during the first 45% of rotation visibility through both shutters occurs with descending illumination through the now closing shutter and rising illumination through the now opening shutter, so that combined viewing effect is that shown by the double hatching between zero degrees and 45 degrees, in FIGURE 17; and that condition also continues from 45 degrees to 90 degrees, but with the interfering effect of reducing value. In fact, with such a continuously rotating shutter embodiment there is no sustained interval when no interference occurs as between the viewings of the two eyes. Such interference effect may soften the overall stereoscopic effect produced on the viewer.

Reference is next made to FIGURE 18. In this case the curves of percent transmitted illumination for the two shutters have been set apart for better interpretation of the effects produced by this arrangement. These curves correspond to the embodiment shown in FIGURE 6 where the rotatable shutter element is rocked back and forth between two selected limits of angular displacement, instead of continuously rotating through the full circular movement of 360 degrees. The curves of FIGURE 18 are numbered 323 and 324, respectively, and the several points 325 and 326, and 327 and 328, shown on such curves, correspond to like elements of the showings in FIGURE 17. The embodiment now being considered is one in which provision has been made for rock of the movable shutter element of each pair of polarizing sheets occurs back and forth between substantially 20 degrees at one end of the rock (fully open position of the shutter) and 25 degrees from the other or 90 degree end of the rock (fully closed position of the shutter). In the showing of this FIGURE 18 the numbering of degrees between 0 and 90 has, for the case of the curve 323 been reversed, but the terminal positions with respect to fully open and fully closed are as stated above. At the upper portion of FIGURE 18 I have shown, by simple line showing, the fully moved positions of the movable shutter elements for the two eyes, and the corresponding moved positions of the link 308 by which such movable shutter elements are simultaneously rocked back and forth. I have also shown the polar axes of the two polarizing elements of the two shutters, drawn to represent the directions of such axes at the extremely moved positions. Reference lines have also been drawn from the points 325 and 326, and 327 and 328, for the two shutters, with the angular positions of the movable shutter elements also shown, being included angles between the polar axes of the two polarizing elements of each shutter. Such reference lines and such angular positions enable ready comparison of the shutter operations, with the percent transmissibility of illumination through each shutter unit.

It is seen that rock has been provided for 45% back and forth for each shutter; and that the terminal position of the rock for each shutter in the "opening" direction, is larger than the corresponding terminal rocked position of such shutter in the "closing" direction. Thus advantage has been taken of the desirability of obtaining the highest degree of transmissibility, combined with limitation of the rocking operations to as small an angle as possible. I have also, in this figure, drawn the straight lines 329 and 330 between the points 325 and 326, and 327 and 328, for the two curves 323 and 324, respectively, to illustrate the fact that the variation of percent transmissible illumination between the terminal positions of the rocking movements of the two shuttters, are very nearly lineal, although the intercepts of such lines with the x-axis of the plot do not extend through the zero positions. In this FIGURE 18 I have also shown a "shift" time interval between the terminal positions of the movements of the two shutters, as of the order of 0.00166 sec., and a "hold" interval of the order of 0.01500 sec., totaling 0.01666 sec., or 60 rocking movements/sec., being 30 movements in one direction, corresponding to field No. I, for example, and 30 movements in the other direction, corresponding to the interlace field. Such rapid reciprocations are produced by alternately energizing the solenoid 309 with current, first in one direction, and then in the other direction, to produce an alternating field, the armature 310 being a permanent magnet. It is seen that by provision for producing quick back and forth rocking movements, with intervals of rest at the extreme positions, it is possible to attain high values of percent transmissible illumination, since most of the time of "open shutter" elapses during the open position, only a small portion of the time being used for shift of the movable shutter element from its "closed" position to its "open" position. Similar considerations also apply to the closing movements of the two shutters, occurring while the companion shutters are moving in the opening directions. Likewise, with this rocking operation the time intervals during which double viewing of appreciable amount occurs, are small, so a much larger time interval of single (or substantially single) viewing is produced.

Referring next to FIGURE 19, this figure also shows the two curves 323 and 324, with the points 325 and 326, and 327 and 328, corresponding to the showings of FIGURES 17 and 18, but with the curves separated for more ready study of the relationships to be described in FIGURE 19. In the present embodiment I have included the two magneto-optics 313 and 314 of FIGURE 9, together with the selector unit for delivery of current alternately to the magnetizing coils of the two magneto-optics under synchronizing control to ensure shutter operation synchronized as needed. In this embodiment the shutter operations are very fast, of the order of ten millionths/ sec., so that each change of shutter condition occurring, there is, to all practical considerations, an instantaneous termination of one shutter's opening, with almost simultaneous full opening of the other shutter. Accordingly, there is no practical interference between the viewings of the two rasters by the two eyes individually.

It is also noted that by incorporating provision in the embodiment of FIGURE 19 for shutter operation between an included angle of shutter open at 20 degrees, and an included angle of substantially 65 degrees for shutter closed condition, the necessary magnetically produced twist of the semipolarized illumination from the polarizing element 317 to the companion polarizing element 318 is greatly reduced, or the needed length of the unit is reduced, or both may be reduced proportionately to the product of magnetization times length.

It will be understood that upon energizing the magneto-optic 313 it promptly shifts from the percentage position 328 to the position 327, or vice versa, actually along the curve 324; but the rate of such shift is so great that the shutter will appear to produce instantaneous change between closed and open conditions. The reverse effect will, of course take place for the condition of the other magneto-optic.

Examples of polarizing sheets capable of use for the shutter embodiments which incorporate polarizing principles, include the transparent sheets produced by the Polaroid Corporation, Polarizer Division, Cambridge, Mass., under the identifications of HN22, HN32, and HN38. These are described in the bulletin of that corporation, titled "The Application of Polarized Light to Basic Design Problems," carrying the notation "F2165." Such sheets, singly, transmit 22% of the incident light (HN22); 32% of the incident light (HN32); and 38% of the incident light (HN38), respectively. A pair of the HN38 polarizers, when used in the "open" position, will transmit about 30% of the incident light. The 100% positions of the various curves shown in FIGURES 17, 18 and 19, are the transmissibility specifications just above given. Accordingly, when using a pair of the HN38 sheets set with the enclosed angle at 25 degrees, the transmissibility would be substantially 85% (see FIGURES 17 and 18, and 19) of 30%, of the incident illumination, being thus 25.50% of the incident light. The foregoing illustrations relate to sheets of cellulose acetate butyrate (commercial grade laminations) of thickness 0.010″ or 0.030″. The transmissibiilty of the illumination will depend largely on the thickness of the sheets used.

Magneto-optic shutters of the characteristics described previously herein are described in technical paper titled "A Rapid-Action Shutter With No Moving Parts," by Harold E. Edgerton and Charles W. Wyckoff, reported in the April 1951 issue of Journal of the SMPTE, vol. 56, Society of Motion Picture and Television Engineers, Inc., pages 398 to 406 of that issue.

Reference is next made to FIGURE 20, which shows how the transmitted illumination arriving at such shutters varies with rotation of such shutters at uniform speed (see FIGURES 1, 2, 3 and 5). With one-half of the area of such a shutter opaque, comprising a continuous area to one side of a diameter of the unit, and starting at a position such as shown in said figures, namely, full open on one side, and fully closed on the other side, the dash lines 331 and 332 show the variation of open area at the right-hand side, starting at full open at zero degrees position, uniformly closing as the rotation proceeds, to fully closed at the 180 degree position, followed by uniformly opening again to the fully open position at 360 degrees, completion of the rotation. At the same time the full lines 333 and 334 show the variation of the opening of the area at the left-hand side, starting at fully closed at the zero degrees position, uniformly opening as the rotation proceeds, to fully open at the 180 degree position, followed by uniform closing again to the fully closed position at 360 degrees, completion of the same rotation as previously analyzed. The hatchings of the two openings to eye viewing are shown by the two directions of such hatchings. It will be seen that viewing by each eye only ceases for an instant at the half rotated position for such eye; being the 180 degrees position for the right eye (FIGURE 5, being 180 degrees from the position as shown in that figure), and being the 0 or 360 degrees position for the left eye (being the position shown in FIGURE 5). It will also be seen that both eyes are viewing the picture at all times except for an instant for each eye, and that such viewing by each eye rises uniformly for the one eye as it reduces uniformly for the other eye, with reverse variations as the 180 and 360 degree positions are passed. Accordingly, the viewings by both eyes are of equal illuminations at the 90 degree position and at the 270 degree position. It will also be seen from this figure that only one complete cycle of the two viewings occurs during each full rotation of the shutter, thus requiring a rotative speed of 30 r.p.s. for production of the rasters at rate previously referred to herein. On the contrary, when using the shutter embodiment shown in FIGURES 8 and 17 each full shutter rotation produces two complete viewing cycles, corresponding to two exposures for each eye, and thus requires only 15 r.p.s. for the rates previously described herein. It may also be noted that such rates of 30 r.p.s. and 15 r.p.s. may be readily produced by small synchronous motors having, for 30 r.p.s., four poles, and for 15 r.p.s., eight poles, using sixty cycle input supply.

In FIGURES 1, 2, 3 and 4 I have included showings of equipment by which, if desired, the reception of the program, and its translation may be produced selectively according to either of two qualities of reception, one a higher quality for which payment is required, either as a prepayment, or on the basis of a remote control operation, or another quality of reception for which such payment is not required. Various embodiments of equipment constituted to make provision for such choice of reception by the user of the receiver, are disclosed in the aforesaid Letters Patent of the United States, No. 3,070,652, which earlier embodiments also include provisions for producing records of time of use of selected programs, to enable accurate determination of data by which payments for such receptions of the higher quality programs may be distributed to the proper sponsors of such programs or for other purposes. The present FIGURES 1, 2, 3 and 4 also include provisions for producing such time of use recordings, with showings of the stations from which the programs were received.

The showings of such FIGURES 1, 2, 3 and 4, also include controls by which the station sending the higher quality program may emit control signals concurrently with the emissions of such special programs, to prevent reception of such programs under their higher quality translation except by the prepayment therefor, or the remote control operation; but may receive and intelligibly translate such special programs under a lower quality of reception without such prepayment or remote control operation. In the embodiments of FIGURES 1, 2, 3 and 4 such discrimination between the higher and the lower quality receptions comprises reception either as a stereoscopic reception, or as a conventional two dimension reception. This result of discrimination comprises the provision of means constituted to enable single raster reception (two dimensional) without need of prepay or remote control, or two raster reception for stereoscopic translation when the prepay or remote control is produced.

Since various of the elements used in connection with such operations, as shown in FIGURES 1, 2, 3 and 4 are substantially the same as corresponding elements and operations shown in various of the embodiments illustrated in such patent, No. 3,070,652, I shall not describe the same here in detail, except as required by the presence of other nonpreviously disclosed elements or operations; and likewise I shall identify the elements which are common to both the present case and such earlier patent by identical numbers, but with different suffixes to the numerals shown on FIGURES 1, 2, 3 and 4, hereof.

The control circuitry at the sending station shown in FIGURE 1 is substantially the same as that shown in FIGURE 3 of such earlier patent, including provision for injecting the control signal of selected frequency (e.g., 50,000 c.p.s.) into the stream of signals being sent to the antenna. The circuitry provided at the receiver shown in FIGURE 1 is also substantially the same as that shown in such earlier patent, for reception and translation of the received control signals; but the following modifications or additions to that earlier receiver circuitry are noted:

The relay 110$^x$ of FIGURE 1 corresponds to the relay 110$^c$ of the earlier patent, such relay 110$^x$ serving to open the circuit serving one of the electron guns of FIGURE 1, whereas the relay 110$^c$ of the earlier patent serves to discontinue the operation of all three of the guns of the earlier patent. Furthermore, the relay 110$^x$ is provided with the upper set of contacts 335 and 336 which are engaged when the lower set of contacts 337 and 338 are inactivated. Accordingly, when the electron gun served by such contacts 337 and 338 is inactivated, during an operation under which the control signal is being emitted from the sending station, such upper contacts 335 and 336 are engaged and remain engaged for a purpose presently to be explained. The contacts 337 and 338 control operation of the electron gun 267$^x$ whose operation translates the signals for producing one raster; accordingly, such raster is not translated on the viewing screen as long as the control signal is being received, and prepay or remote control has not been made. Under these conditions, however, the gun 268$^x$ remains in operation and will translate the other raster on the screen. Thus conventional two dimension picture translation may be received without prepay or remote control, during the interval of reception of the control signal (which is also the interval of reception of the special program of higher quality).

Since under the single gun translation above explained the overall illumination of the rasters (picture) produced and viewed by the user, is only substantially one-half of the overall illumination normally produced on the screen (both rasters being translated), it is desirable to reinforce the single gun translation, with corresponding amplification of the brightness of the translation produced thereby. This may be done in various ways; but in the showing of FIGURE 1 it is done by increase of the electron gun strength during such single gun reception. This is accomplished in the following manner:

A double amplification unit 339 is included in the line 280$^x$ which serves such gun 268$^x$. The leads 340 and 341 extend from the two ends of such double amplifier to the contacts 342 of a relay 343 which, when unenergized, drops to connect such contacts 342 together, thus shorting out the double amplifier unit 339, so that normal strength operation of the gun 268$^x$ will occur at such time. When however, such relay 343 is energized to raise its armature, such short-circuiting of the double amplifier will be removed with corresponding increase of the overall illumination produced by the signal raster. The energizing of such relay 343 is produced by the closing together of the upper contacts 335 and 336 of the relay 110$^x$, produced by the presence of the control signal and its reception by the receiver, without prepay or remote control. It is thus evident that I have made provision for amplification of the illumination produced by the single raster operation, when such amplification is desirable, and for ensuring normal operation and illumination from such raster when both rasters are being translated on the screen. Such condition of normal operation of both rasters will occur when the control signal is not being emitted by the sending station, and also when it is being emitted by the sending station, prepay or remote control having been produced.

It is noted that the amplification unit shown at 339 is a double amplification unit, since each stage of amplification reverses the signals from positive to negative and vice versa; so I have provided two stages of amplification to cause the electron beam to produce a "positive" raster, instead of a "negative" raster which would of course be unacceptable for normal viewing.

I have also, in FIGURE 1 shown a block titled "B" connected to the contact 150$^x$ and the lead 151$^x$ in FIGURE 1, together with a positive input lead to such block B. This block indicates a normally open microswitch, which when closed supplies positive connection to the lead 151$^x$ even when the relay 144$^x$ remain unenergized, no control signal being emitted by the sending station. This microswitch is contained in a unit shown in FIGURES 21 to 29, inclusive, presently to be described.

I have also shown, in FIGURE 1, another block titled "A," located intermediate between the amplifier 344 and the line 345. This block indicates a normally closed microswitch which, when opened discontinues supply of current to the line 345, and thus terminates raster production for either raster while thus opened. This microswitch is also contained in the unit shown in FIGURES 21 to 29, inclusive.

It is believed that the foregoing description of FIGURE 1, read in connection with such FIGURE 3 of Patent No. 3,070,652, will explain the showing of such FIGURE 1 in complete detail.

Reference is next made to FIGURE 2 of the present application. The circuitry of the control signal elements of this embodiment is similar to that already discussed in the showing of FIGURE 1, but with certain modifications, as follows:

In FIGURE 2 I have made provision for injection into the stream of signals emitted from the sending station, two control signals of different but both preferably supersonic frequencies, such as 50,000 c.p.s., and 47,260 c.p.s. These two control signals are both received by the receiving station receiver. Both of such signals are produced and so introduced into the stream of signals during production of a special program for which prepay or remote control is required to enable the user to view the full translation of both rasters, stereoscopically.

Response elements in the form of tuned oscillators, tuned to the frequencies of such two control signals, are provided in the receiver. These are designated for convenience as "I" and "II" in FIGURE 2. The corresponding control signals are produced at the sending station by the oscillators No. I and No. II as shown. Accordingly, reception of either or both of such control signal frequencies will cause response by the two receiver units I and II, respectively, provided that both of such units are, at the time of reception of such control signals, tuned to the corresponding resonant frequencies. In FIGURE 2, the conventional tubes 140$^y$ and 346 are shown, corresponding to such tuned oscillators I and II, respectively. The grids 141$^y$ and 347 of such tubes are controlled by rise of potential of the resonant frequency oscillators, I and II, when resonance occurs, thus activating each of the tube plates 142$^y$ and/or 348, as the case may be, when the two control signals are both being emitted.

It now noted that I have shown, at convenient location in FIGURE 2, a block 349 carrying the legending "Adjustable Frequency Response Oscillator Set to Respond to No. II." This unit is shown in FIGURES 21 to 29, inclusive, presently to be described; but it is here noted that such unit includes in suitable enclosure an oscillator comprising, the form shown, the conventional reactances in the form of an inductance and a capacitance in parallel connection with terminals into and from such enclosure for connection to the two lines 112$^y$ and 112$'^y$ leading from the sound trap and delivering the control signal frequencies for processing. These two lines also connect to the oscillator terminals of the oscillator 137y which includes the inductance and capacitance, 138y and 139y, respectively, as shown in such earlier patent. Generally the oscillator 137y will remain as originally installed, to respond to the fixed control frequency of 50,000 c.p.s., being No. I. The grid 141y of the oscillator 137y connects to the line 121'y, and a line 350 extends from the unit 349 to the grid 351 of the tube of unit II. Accordingly, the grid of the unit I will respond to resonance produced in the oscillator 137y, and the grid of the unit II will respond to resonance produced in the oscillator contained in the unit 349. The small capacitor 352 is included in the line 121'y at a position between the two oscillating units I and II, to avoid cross interference between resonant conditions produced in the two oscillators, and to ensure independent response of each grid to the corresponding resonant frequency. Such capacitor 352 is shown in FIGURE 2 and it is also shown in FIGURES 22 and 23, within the enclosure, for better understanding of the function produced by such capacitor.

The plate 348 of the tube II is connected to one side of the solenoid 353 of the relay 354, so that when the unit II responds to the second control frequency (e.g., 47,260 c.p.s.), such relay will raise its armature and close its contacts. This will electrify the line 357 serving the contacts 119y and 79y of the solenoid 116y (relay 115y), and of the coin operated prepay unit, respectively. It is here noted that with this two control signal embodiment, such prepay unit is normally open, and closes its contacts when coins are inserted, thus differing from the unit shown in FIGURE 3 of Patent No. 3,070,652 and various other figures of that patent. This difference will also be referred to again hereinafter.

It is now apparent that the relay 143y responds to the first control signal (No. I), previously shown in said earlier patent, No. 3,070,652 and elsewhere, and that the relay 354 responds to the control signal No. II, of different frequency. In that earlier patent the relay 110c which controls the activations of the kinescope guns is a simple relay, responding to a single signal delivered to the single solenoid of such relay, and under the single control of the prepay unit 77c or the remote control unit 81c of that patent; such single control when operative by receipt of the single control signal from the sending station, serving to raise such solenoid, and thus to deactivate the guns. In the showing of FIGURE 2 thereof, the relay 110y is a differential relay, provided with two solenoids, with provision for activation of such relay (raising its armature and opening its control circuit) by supply of current to either of such solenoids; but the magnetizing effects of the two solenoids are in opposite directions, and of equal strength, when simultaneously present, to neutralize the magnetizing effect, thus permitting the armature to drop and again close its contacts. Said contacts 358 control delivery of the gun activating signals to the gun 267y for the first raster of the translated picture.

Delivery of current to the solenoid I of such relay 110y will thus raise the armature and discontinue operation of gun 267y. Delivery of current to the solenoid II of such relay 110y will produce magnetizing effect contrary to that of solenoid I; and such delivery of current to the solenoid II will be under control of either the prepay unit or the remote control unit; and it is remembered that activation of the relay 354 by response to the second control signal, II, closes its contacts 355 and 356 to electrify the line 357. Accordingly, when both of the control signals are being emitted and both are being responded to by the corresponding resonant elements, the solenoid I of relay 110y will be energized; but solenoid II of such relay will not be energized, notwithstanding that the control signal II has produced resonance in the second oscillator unit, with corresponding raising of the relay 354 and electrification of the line 357, until either prepay or remote control has been produced. Thus the receipt of the two control signals will deactivate the gun 267y and will also condition the line 357 for delivery of current to either the prepay unit or the remote control unit, so that immediately such prepay or remote control is made the activation of such gun 267y will be restored. The desirability of this double signal control will appear hereinafter when the unit shown in FIGURES 21 to 29 is described.

It is noted that FIGURE 2 does not include any showing of the microswitch units A and B, shown in FIGURE 1. It is now explained that these microswitches serve to protect against improper reception of the special program whenever the resonant element 137x of FIGURE 1 may be inoperative, either by failure of such resonant unit to respond to the single control signal or otherwise. Such a condition will be referred to hereinafter in connection with the unit of FIGURES 21 to 29, inclusive.

On the contrary, failure of the resonant element II of FIGURE 2 will of itself automatically prevent electrification of the line 357 leading to the prepay unit and to the relay 115y for the remote control unit, so that reception of the special program under intended conditions (both rasters) will not be possible even if prepay is made or the remote control unit is activated. Single raster operation under these conditions will, however continue to be available.

At this point I mention that although the resonant element for the second control signal II is not shown within the area defined as "Use Recorder and Prepay Control," in FIGURES 2, 3 and 4, such figures do include the element 349 connected to the proper circuitry, and legended as previously defined. This unit may conveniently be located elsewhere than in the immediate vicinity of the receiver, with the three conductor line establishing plugging connection between the parts; but the three element tube II for each of such figures is conveniently located elsewhere than in such element 349.

Comparison of the circuitry of FIGURES 1 and 2 also reveals the following important operational difference between the two control signal systems. In FIGURE 1 raising of the relay 110x to disable the operation of one of the guns, and thus prevent production of the corresponding raster, is based on the requirement that both the pre-pay unit 77x and the remote control relay 115x shall have their contacts in engagement as long as the gun 267 is to be disabled (the control signal No. I being received), and the improper opening of the circuitry leading to the relay 110x will allow such relay to drop, thus restoring double raster interpretation without prepay or remote control operation; whereas, the arrangement shown in FIGURE 2 is such that both the prepay unit 77y and the remote control relay 115y are normally open, and neither of such control units can deliver current to the second coil II of the relay 110y to allow it to drop for restoration of the operation of the corresponding gun, until either the contacts of the pre-pay unit, or of the relay 115y are purposefully closed. Furthermore, in the embodiment of FIGURE 1, both of the prepay unit contacts and the remote control relay contacts must be simultaneously closed to retain the relay 110x in raised position for disablement of the corresponding gun. Thus the jamming or other malfunctioning of the contacts of either of such units will restore the gun to operative condition.

The arrangement shown in FIGURE 3 is substantially the same as that of FIGURE 2, but with the provision for color signals emission and reception and translation instead of monochrome. This showing in FIGURE 3 also includes the provision for the two control signals operation, which has already been fully explained.

It will be understood that although I have, in each of FIGURES 1, 2 and 3 shown the view discriminating unit as comprising the rotating disk shutter of FIGURE 5, still I contemplate the use of any of the previously disclosed forms of shutter in connection with any of the embodiments of equipment as herein disclosed or in connection with other forms of television stereoscopic reception with which such shutters may be found useful.

Referring now to the embodiment shown in FIGURE 4, in this case, also, the two control signal feature is included, with circuitry substantially the same as that shown in FIGURES 2 and 3; but in the present embodiment only one gun is needed for production of both rasters. The arrangements then provided are such that during reception of non-prepay or payment programs, as to which the control signals are not emitted, such single gun produces both rasters according to conventional operations; but for prepay or payment programs such gun is disabled during delivery of signals corresponding to one raster, until the prepay or remote control operation has been made. Thus, this embodiment is substantially compatible, with the exception of the needed control signal features. The following comments respecting this embodiment are also pertinent:

Since the viewing unit comprises a simple pair of eyeglasses which are provided with windows formed of polarizing transparency, and with the polar axes of the two windows substantially parallel to the polar axes of the two sets of polarizing strips corresponding to the two rasters, it follows that both eyes of the observer are continuously focused at the kinescope screen; but each eye is only permitted to see illumination coming from the screen under the same direction of polar axis as that of the window of the eye in question. Accordingly, the "rasters" may be of any selected spatial content, such as, single scans, or single fields, or even only portions of scans. The rate of transfer from areas of one type of polarization to the other type may be as great as desired, since the eye will only be permitted to see illumination of the proper and corresponding polar axis specification. Furthermore, in case of slight wavering of the electron beam during scanning so that it improperly excites elemental areas of adjacent scan positions, the viewing from such adjacent scan positions will be prevented since the illumination thus improperly produced will be shut off from the one eye but permitted to the other eye. Such accidental improper scan conditions will thus merely soften the overall picture production without material reduction of the stereoscopic effect desired.

It is also seen that with this embodiment the illumination emitted during scan of all portions of the raster will be of the highest percent transmissibility of the polarizing material of the scan strips, as well as of the eye-glass windows, since the permitted viewing and reception of illumination will always be under conditions of registration of the polar axis of the viewed raster element with the polar axis of the viewing window. The frame adjusting unit such as shown at 322$^A$ may be used to ensure good registry of the electron beam scans with the polarizing strips, for avoidance of overlap perviously referred to, as much as possible consistent with the tolerations permitted by manufacturing operations.

It is also noted that although the showing in FIGURE 4 is lengended for monochrome television, still the same embodiment as shown in that figure may be used for color television operations, with proper adjustment of the widths of the polarizing strips to correspond to the scans produced during such color operations.

It is now noted that when stereoscopic signals are being emitted by the sending station in manner to produce two sets of such signals corresponding to two viewing locations of the common object such two sets of signals may be received on a conventional receiver with conventional kinescope; and without provision of the circuitry shown in the various figures herein described, and without provision for discriminating the delivery of the signals of the two sets between reception by the two eyes of the observer. In such case, however, the reception will not be a stereoscopic translation but will be a two dimension reception, possibly somewhat blurred. In case of such an operation, however, the reception may be brought into the stereoscopic operation by setting a striped polarizing screen directly against the outside surface of the kinescope window, according to the dashed line showing in FIGURE 13, with corresponding provision of the eyeglass unit of the type shown in FIGURES 4 and 7. Thus, it would be possible for a person to obtain the benefits of stereoscopic reception of such a stereoscopically emitted program, without prepay or remote control functions. It must be noted however, that such an unauthorized operation would be also unauthorized as respects the conversion of the viewing screen of such otherwise conventional kinescope into a screen capable of producing stereoscopic viewing when used in connection with the discriminating means shown in said FIGURES 4 and 7.

However, such an unauthorized adaptation of the viewing screen as just suggested, and its unauthorized use, may be practically prevented by use of one or more of the special signal producing or control arrangements disclosed in said patent, No. 3,070,652. Thus, in FIGURE 4 hereof I have shown, by the block 385 in the circuitry of the sending station, reverser switch means by which the order of vertical deflection of the scans produced by the two cameras may be reversed, being then from bottom to top instead of the conventional operation of scanning from top to bottom; and such reversed scanning procedure would result in production of an upside down picture on the kinescope viewing screen. Since the conventional receiver is not provided with means to reverse the vertical order of scanning, such conventional receiver, thus improperly used, would not be able, in its conventional use, to deliver an acceptable picture, although it could produce an unacceptable picture of stereoscopic quality. With such provision for reversal of the vertical order of scanning at the sending station, receivers intended for stereoscopic reception as herein disclosed, would also be provided with means to reverse the vertical order of scanning, either by a manual switch control, or automatically by connection with prepay unit, or the remote control unit, as desired, and according to the teachings of that earlier patent, No. 3,070,652. Such reversing switches in the receiver are shown schematically by the blocks 386 and 387, for the vertical deflections, and the horizontal deflections, respectively; but in most cases such horizontal deflection direction reverse would not be required. Other means to produce operating conditions of a nature to require special response at the receiver to meet special operating conditions produced at the sending station, are also disclosed in said earlier patent. I contemplate use of any such devices, or other devices, in combination with the embodiment shown in FIGURE 4, as may be needed or suitable to prevent acceptable picture translations by improper or unauthorized use of conversions of the conventional kinescope, which conversions would enable such conventional kinescopes to translate the two rasters for production of the stereoscopic reception. Specifically, such means to reverse the vertical direction of deflection or progress of the scans is shown in FIGURE 12 of Patent No. 3,070,652, and is claimed in claims 27 and 28, and possibly others, of that earlier patent.

Each of the embodiments shown in FIGURES 1, 2, 3 and 4 includes means to record all uses of the kineoscope, whether during reception of non-prepay or remote control programs, or during reception of special quality programs requiring prepay or remote control, showing the times and intervals and durations of such uses, with discrimination between the channels over which the programs are received. Since such recording means is the same as shown in various figures of such earlier patent, with complete disclosures of operations thereof, it is unnecessary to describe such recording units herein. It is, however, noted that various of the elements of such equipment are numbered the same in the present FIGURES 1, 2, 3 and 4, as in the figures of such earlier patent, No. 3,070,652, but with suffixes other than used in such earlier patent.

Reference is next made to FIGURES 21 to 29, inclusive. The unit therein shown comprises a special form of oscillator unit tuned to response to one of the control signals emitted by a sending station. Accordingly, the natural resonant frequency of this oscillator must be the same as (or very close to the same as), the control frequency being received, and to which response is desired, with nonresponse to other received frequencies. The unit now to be described may be used, when having the proper resonant frequency, in any of the locations of response units shown in FIGURES 1, 2, 3 and 4, and various other embodiments of circuitry some of which are shown in said earlier patent. The following explanation is pertinent to an understanding of the present unit and its uses:

It is desirable or necessary to make provision for keeping records of the locations and persons whose receivers are provided with the equipment constituted to receive and translate the special programs for which payment is required. Accordingly each such person or group possessing such receivers should be identifiable by a proper indicia, and the address of such person or group should be known. Such data will enable proper examination of the receivers scattered over the program receiving area, from time to time, for such purposes as may require such examinations. Accordingly a convenient means for such identifications comprises the assignment of a serial number to each receiver thus in use. Furthermore, when a so-equipped receiver is delivered to the subscriber and is placed in service, if it is used on the remote control basis, with the keeping of proper records of use, and of charges for the special programs received, payment for such recorded uses should be made periodically. Under such conditions provision must be made for rendering the receiver in capable of the intended translations if payments are not made as contracted, or for other reasons.

It is thus desirable to be able to change the control frequencies from time to time, keeping the new frequency values secret to the proper authorities, so that an improper change may not be made by the user of the equipment to bring his equipment into condition for response to the newly adopted frequency. The unit now to be described includes a removable oscillator element, including the inductance and capacitance in parallel connection, and of specifications to produce response to the intended natural frequency. Such removable oscillator element is then sent to the proper office where it may either be changed to bring it to the newly adopted frequency, or a different oscillator element, already assmebled and of the new response frequency, may be sent to the user, who may then set it into place in the response unit, without need of other than very simple operations by such user. Provision is also made to enable the proper authority to seal such new response element to a section which can only be set into the housing or container assigned to the user in question and who is identified by the serial number or the like, already referred to. Reference is now made to the figures as follows:

A box 359, provided with a hinged cover 360, encloses the oscillator elements. Provision may be provided for locking such cover in closed position, not shown. Within such box there is removably seated a plate 361. Conveniently the walls of the box are shouldered as shown at 362, so that such plate, when inserted will be supported at the correct elevation to provide for certain relationships to be presently described. The cover is also so formed that when closed it will engage the perimeter of the plate to retain it in seated conditon. (See FIGURES 24, 25, 26 and 27.) Such plate carries the elements of the oscillator, either directly or by providing a seat for another smaller plate, as shown in the present figures. It is contemplated that such plate 361 shall be removed periodically and returned to the central or accounting office, for change of the oscillator elements to provide for reception of the newly declared resonant frequency of the control signal to which such oscillator will respond. In order to ensure that only one particular plate shall be identified for use in the unit supplied to each subscriber to the prepay or remote control service, the following structural provisions have been made:

Each subscriber to the service is assigned an identifying number or serial number. In the present showing provision has been made for accommodation of numerals as great as six digits or numerical orders, namely, up to 999,999 subscribers. A set of upstanding studs 363 are secured to the floor of the box, such studs being spaced laterally of the box at regular spacings corresponding to the numerical orders, and defined by the dashed lines 364. Also, each stud is located on its line 364 at a position corresponding to the digit which such stud represents. Such digits are shown opposite to the left-hand ends of the lines 365 for identification. Thus, the studs shown in FIGURES 22 and 23 identify the number 008463. Since the studs are provided on the different boxes supplied to the subscribers to the service, each box may thus be individualized to its particular subscriber.

The plate 361 for each subscriber's box is provided with openings located at positions to correspond to the locations of the studs of his individual box, and only one plate is provided with openings of such particular locating. Accordingly, when the plate 361 of a subscriber is sent to the central office for any purpose, including the change of its oscillator components to respond to a different resonant frequency than before, there is assurance that such particular plate shall be returned to its individually identified subscriber. If desired the central office may also be provided with a duplicate set of plates, under its close supervision, so that when changes of the responding frequency are to be made, as publicly or otherwise announced, the proper duplicate plate may be sent to the subscriber, who will then substitute such duplicate plate for that one previously in use, sending such previously used plate to the central office. It will be understood that due to the correspondence of the positions of the openings in a plate, with the positions of the studs of the corresponding box, only plates having the correctly located openings can be set over the upper portions of the studs, and down against the shouldered seat 362, of the box walls. It is necessary that such full seating be produced for reasons to be hereinafter explained.

Conveniently, each plate 361 is marked with the same identifying number as that of the subscriber, and as shown by the positions of the studs, such plate identification being shown a 366 in FIGURES 22 and 23.

Each plate is provided with a front to back extending opening 367 into which is slidably inserted the smaller slide 368, proper tongue and groove provisions being made for such operations. Such slide is provided with arrangements for receiving and retaining the inductance and the capcitance of the oscillator. For this purpose, as shown in FIGURES 22, 27, 28 and 29, shallow recesses 369 are provided on the top and bottom faces of the slide opposite to each other, with narrow slots through the slide plate at the sides of such recesses, so that the inductance coil may be produced by winding the fine wire up and down through such slots and across the recesses at top and bottom of the slide, as shown in FIGURE 29. Other deeper recesses 370 are also provided in the top and bottom surfaces of the slide, to accommodate the plates 371 of the small capacitor of the oscillator, a thin partition of the dielectric material from which the slide is made being left between the recesses 370, such thin partition separating the plates as required.

Cross connections 372 and 373 are provided between the proximate ends of the inductance and capacitor plate, to produce the terminals of the oscillator. These cross connections are then connected to downwardly extending fins 374 and 375 carried by the under surface of the slide. The floor of the box is provided with the upstanding posts 376 and 377, and to the tops of such posts there are secured the upwardly reaching contact clips 378 and 379. The fins 374 and 375 are properly set to register with the clips when the slide is set fully back into the opening 367 of the plate 361; and such fins are also of vertical dimension to fit snugly into their companion clips when the plate 361 is seated well down onto the shoulder 362 of the box walls. Accordingly, to move the oscillator unit from the box it is only necessary to raise the plate from its seat against the shoulder and from engagement with the studs 363, and thus from the box, and then the slide may be withdrawn edgewise from such plate. Another slide, provided with inductance and capacitance elements corresponding to some other resonant frequency, may then be substituted into the plate 361, which plate may then be returned to the subscriber for reinstallation into his box.

I have, in FIGURES 22, 24, 25 and 28, shown means to lock and seal the slide to its corresponding plate, if desired, as follows: At its inner end (farthest from the viewer in FIGURE 22) I have provided a reduced thickness socket of the plate 361; and the corresponding inner end of the slide is provided with a companion comparatively thin lug 380 which will seat into such socket of the plate 361. Then a headed stud 381 may be set up through registering openings of the plate 361 and of the lug 380, to lock the slide in position within the plate; and if desired, finally a seal wire 382 may be set and sealed through the cross opening at the upper end of such stud. Accordingly, when the slide is set into place in the plate, by the authorized person at the central office, the parts may be sealed together, and sent thus to the subscriber for installation in his receiver unit, or box.

It is now noted that provision need not be made for locking the box cover in closed position; especially since the subscriber is, according to the foregoing explanation, the person who will set the plate, including the slide having the newly selected resonant frequency, into the box. Also, it is noted that such subscriber may also remove the plate and slide from the box, thus destroying, for the time being, the provisions of circuitry which depend on resonant reception of the corresponding control signal, for proper circuitry operations. The following comments are therefore pertinent:

First: Such a security unit arrangement may be used for the oscillator $137^x$ of the single control signal arrangement of FIGURE 1. If the plate 361 of such oscillator unit should be removed, thus destroying the resonant reception of the circuitry shown in FIGURE 1, the relay $143^x$ of FIGURE 1 would not rise during reception of the reception of the special program. Accordingly, no current would be supplied to the relay $110^x$, and therefore the kinescope gun $267^x$ would remain operative, for reception of both of the rasters of such special program, with concurrent production of the stereoscopic effects. Thus, the subscriber would have it within his power to receive such special program without prepay or remote control. To obviate this undesirable possibility I have made two provisions, as follows:

Reference has previously been made to the provision of the two microswitches indicated at "A" and "B" in FIGURE 1. These are shown at 383 and 384 in FIGURES 22, 23, 24, 25, 26 and 27, carried by the floor of the box and beneath the plate 361. The operational leaves of these microswitches are at an elevation such that when the plate 361 is set full down against the shoulder 362 of the box, such microswitches are shifted to reverse positions, thus placing the contacts of the microswitch A (383) in normally closed position, and the contacts of the microswitch B (384) in normally open circuit position. Accordingly, under such condition (the plate 361 being in working position within the box), current will be supplied for operation of both of the guns of the kinescope. Also, under such condition of plate 361 being in intended position within the box, the microswitch B (384) will have its contacts in open condition; since under such normal working conditions of the box unit, current will be supplied to the prepay and remote control units through the contacts of the relay $143^x$.

Upon removal of the plate 361 both of the microswitches will reverse condition, opening the circuit which supplies the guns, by opening the switch A (383) and closing the circuit controlled by the switch B (384). Such switch closing will then supply current to the contact $150^x$ and thence through the contacts of the relay $115^x$ and through the contacts of the prepay unit, to the relay $110^x$, thus cutting off current supply to the gun A (267). Since both guns have been deactivated it is evident that a double protection is afforded against improper servicing of the gun 267.

Second: Referring next to the circuitry of FIGURES 2, 3 and 4, since the circuitry of these three embodiments is the same, insofar as concerns the matters now being considered, I shall refer only to that shown in FIGURE 2. If the oscillator for the control signal II alone is incorporated into such a unit as that shown in FIGURES 21 to 29, inclusive, it will be seen that removal of the plate 361 from such unit will prevent operation of the tube $346^y$. Accordingly, operation of the relay $354^y$ will not occur, so that the line $357^y$ will not be electrified and accordingly, neither prepay nor remote control operation will energize the solenoid II of the relay $110^y$. But the oscillator $142^y$ will be properly serviced by the control signal I, with corresponding raising of the relay $143^y$. Under these conditions the solenoid I of such relay $110^y$ will be energized, to raise the armature and thus deactivate the gun $267^y$. Accordingly, under the assumed condition of removal of the plate 361 from the box for the oscillator which is resonant to control signal I, will produce deactivation of the gun $267^y$ so that the stereoscopic translation cannot be produced. If, however, both of the oscillators for response to both of the control signals should be de-activated by removal of the places 361 from boxes for both of the control signals, both of the relays $143^y$ and $354^y$ would remain in their non-activated positions, and accordingly, neither of the solenoids I and II of the relay $110^y$ would be energized. Thus such relay would remain down, and the gun $267^y$ would be operative to produce its raster, with corresponding production of stereoscopic reception. It is, therefore desirable that when using the two control type of operation, only one of the oscillators, for one of the control signals, be provided with the features of construction and operation characteristic of the unit shown in FIGURES 21 to 29, inclusive. It is also noted that since the embodiment shown in FIGURE 4 includes a single gun, nevertheless the discussion just previously recited will apply to the operations of such gun.

It is also noted that although each of the embodiments shown in FIGURES 1, 2 and 3 includes two guns, corresponding to the two rasters, various of the features disclosed in such embodiments may be used in one gun embodiments.

Reference is next made to FIGURES 30 to 36, inclusive. These figures disclose an embodiment similar to that shown in FIGURES 4, 7 and 12, 13, 14, 15 and 16; but whereas the embodiment of such FIGURES 4, and 12 to 16 incorporates the use of polarizing operations, with the stripes which are scanned by the electron beam formed of polarizing material, with eyeglass viewing means also incorporating such polarizing material, the embodiment shown in FIGURE 30 and FIGURES 31 to 36, inclusive, incorporates the use of transparencies of complementary colors, both for the stripes and for the viewing apertures of the eyeglass viewer. Accordingly, various of the elements shown in FIGURES 30 to 36 appear the same as those shown in the polarizing operation embodiment referred to above, and such elements carry the same identifying numerals as used on the polarizing operation embodiment, but with the suffix B instead of A. It is also unnecessary to describe the embodiment of FIGURES 30 to 36 in full detail; but the following statements, applicable to the use of complementary color transparencies instead of polarizing material transparencies, are proper:

Examples of complementary colors are Orange-Red and Blue-Green. When either of such transparencies receives light waves of the frequencies to produce the corresponding color, such frequencies are transmitted through the transparency, but waves of other frequencies are blocked and not transmitted. Therefore, if two transparencies of either of such colors are located in series, such color will be transmitted; but wave lengths other than for such color will be blocked. Conversely, if wave lengths of one such color are transmitted through a transparency of such color from a light source producing such color, a transparency of the complementary color (for example, included in one of the eyeglass windows) will block transmission of such color so that the corresponding eye will not see the elemental image corresponding to such light beam. If, however the other eyeglass window is provided with a transparency of the same color as that of the incident beam, such colored beam will be transmitted to the corresponding eye.

An example of such operational condition is shown in FIGURES 30 and 31, where the right-hand eyeglass window 305$^B$ is seen to transmit the light beam produced by the stripe then being excited, whereas the eyeglass window 304$^B$ is seen to block light produced by such stripe.

FIGURES 33, 34, 35 and 36 show several forms of the kinescope viewing screen provided with the striped area of the two complementary colors. In FIGURE 33 the striped element is set directly against the inside surface of the window, with the phosphor target between such striped element and the gun, such phosphor target in such embodiment, comprising phosphor which will emit white light when excited by the electron beam. If desired, a film of protective material may be included between the phosphor target and the striped element. In the embodiment. In the embodiment shown in FIGURES 34 and 36, the kinescope window itself is formed of the striped element. In FIGURE 33 I have also shown, by dashed lines, a detachable striped element which may be removably set against the outside of the kinescope window, and held in place by clips. When such an arrangement is used (or in any case) provision may be made, according to conventional practice, for adjusting the vertical position of the frame produced by the cross scans of the electron beam, in order to bring such scans into registry with the stripes of the striped element. A further embodiment of the striped element is as follows:

The color stripings may be produced on the inside surface of the kinescope window photographically, according to the method disclosed by me in my Letter Patent of the United States No. 2,683,769, issued July 13, 1954, and described commencing column 37, line 59 of that patent. The color lineated or striped screen thus produced will be very thin and transparent. Due to its thinness there will be substantially no parallax between the surface of the excitable phosphor and the window of the kinescope. A further means for producing the striped screen against or close to the inside surface of the kinescope window comprises the following: The excitable phosphor surface comprises stripes of two different compositions of phosphor, each of which two compositions will emit light of the desired complementary color. As examples of such different phosphors I may mention zinc orthophosphate for producing the orange-red emitting wave lengths, and calcium tungstate or zinc sulphide (which produce blue wave lengths) mixed with proper proportions of zinc oxide (which produce green wave lengths), for producing the blue-green wave lengths.

It is noted that when using the two stripe, complementary color arrangement of the embodiments herein disclosed, together with the complementary color eyeglass viewer, each eye of the observer will see a raster of color dictated by the color of the corresponding eyeglass window. However, mixing such complementary colors results in production of substantially white light. Accordingly, due to the persistence of vision, the impression produced to the viewer will be that of a picture of monochrome characteristics. Thus, the stereoscopic translation produced by the use of such complementary color arrangements, will be a monochrome translation. It is also evident that when producing both rasters by translation of signals emitted by a single camera, under nonstereoscopic conditions (single camera, and non-use of the eyeglass viewer), both eyes will see both rasters, and thus will see rasters of both colors; but in this operation, the impression produced to the viewer will also be that of a monochrome translation, due to the persistence of vision. Again, if the phosphor surface target within the kinescope envelope be such as to produce white light, and if the color lineated, removable screen embodiment shown in FIGURE 33 (by dashed lines), be removed from the kinescope, the translation will also be a monochrome translation.

Referring next to FIGURE 37, in this case I have shown schematically, a two camera signal producing embodiment, with provision for emitting the two rasters, either from such two cameras alternately, or from a single camera producing both of the rasters signals. This selective operation is produced by use of the switch 385$^C$. When such switch is set to the position shown in this figure the camera A delivers its signals to the outer ring of the unit F#2 and the camera B delivers its signals to the outer ring of the unit F#1. Each of such units F#1 and F#2 is in synchronism with one of the raster or field producing operations of the receiver; thus the translation will be that required for the stereoscopic operation. On the contrary, when such switch is set to its down position (FIGURE 37), only the camera A will be in service, and the outer rings of both of the units F#1 and F#2 will receive their activating signals from such single camera A. Thus both of the rasters produced by the receiver will be in correspondence with signals from such single camera, and a true two dimensional translation will be produced.

In the arrangement shown in FIGURE 38 the switch 385$^D$ will produce results corresponding to those just explained with respect to the switch 385$^C$, so it is unnecessary to describe the arrangement of FIGURE 38 in further detail.

It is to be noted that such special switching means of FIGURES 37 and 38 is usable with the sending station equipment regardless of the embodiment of the receiver, to enable emission of the needed signals from the sending station for either stereoscopic or two dimensional translation.

Since the control signals Nos. I and II, used in connection with the prepay or remote control operations, are not used during a two dimensional operation under which the control equipment shown in various figures is brought into play, it is then unnecessary to emit such control signals. Accordingly, I have, in FIGURES 37 and 38 shown the gang connections between the switches 385$^C$ and 385$^D$, and the control operation switches; such gang connections being identified as 386$^C$ and 386$^D$, respectively.

I claim:

1. In a television system, the combination of a sending station including means to produce and emit first defined sets of video signals which when received and translated in a receiver produce a raster corresponding to viewing an object from a first defined vantage point, and including means to produce and emit second defined sets of video signals which when received and translated in said receiver produce a raster corresponding to viewing said object from a second defined vantage point, said video signals producing and emitting means including means to emit the first defined sets of video signals and the second defined sets of video signals in successive alternation; together with a receiver including means to receive both sets of video signals in the alternation of their production and to translate said two sets of video signals with production of rasters in such alternation and with production of a three dimensional picture, or to translate video signals corresponding to viewing said object from a single vantage point and with production of a two dimensional picture, selectively; and receiver operator controlled means in connection with said receiving and translating means, constituted either to cause translation of both of the sets of video signals alternatively, corresponding to viewing said object from two vantage points alternatively and with production of the three dimensional picture, or to cause translation of the video signals corresponding to viewing such object from a single vantage point, with production of the two dimensional picture, selectively.

2. In a television system, the combination of a sending station including means to successively produce first defined sets of picture signals corresponding to fields of viewing an object from a first vantage point, means to successively emit said first defined sets of signals corresponding to successive rasters of a replica of such object from such first vantage point, means to successively produce second defined sets of picture signals corresponding to fields of viewing such object from a second vantage point, means to successively emit second defined sets of signals corresponding to successive rasters of a replica of such object from such second vantage point; means constituted to emit the sets of the first defined signals and the sets of the second defined signals in alternate successions of such sets, or to emit only successive sets of signals corresponding to viewing said object from a single one of such vantage points, selectively under control of an operator; together with a receiver including a viewing screen, means to receive and interpret the signals of said sets, including means to produce a raster on said viewing screen corresponding to each set of signals, and including means to produce first defined rasters corresponding to the first defined sets of signals and the second defined sets of signals, alternatively, for production of a first defined three dimensional picture on said viewing screen, or to produce only rasters corresponding to a single one of said sets of signals for production of a second defined two dimensional picture on the viewing screen, selectively; and receiver operator activated means constituted to select either of the alternative three dimensional picture production or the single two dimensional picture production.

3. In a television system, the combination of a sending station including means to successively produce first defined sets of picture signals corresponding to fields of viewing an object from a first vantage point, means to successively emit said first defined sets of signals corresponding to successive rasters of a replica of such object from such first vantage point, means to successively produce second defined sets of picture signals corresponding to fields of viewing such object from a second vantage point, means to successively emit second defined sets of signals corresponding to successive rasters of a replica of such object from such second vantage point; means constituted to emit the sets of the first defined signals and the sets of the second defined signals in alternate successions of such set, or to emit only successive sets of signals corresponding to viewing said object from a single one of such vantage points, selectively under control of an operator; together with a receiver including a viewing screen means to receive and interpret the signals of said sets, including means to produce a raster on said viewing screen corresponding to each set of signals, and including means to produce first defined rasters corresponding to the first defined sets of signals and the second defined sets of signals, alternatively, for production of a first defined three dimensional picture on said viewing screen or to produce only rasters corresponding to a single one of said sets of signals for production of a second defined two dimensional picture on the viewing screen, selectively; and receiver operator activated means constituted to select either the alternative three dimensional picture production or the two dimensional picture production; wherein said receiver operator activated selecting means comprises a prepay unit.

4. In a television system, the combination of a sending station including means to successively produce first defined sets of picture signals corresponding to fields of viewing an object from a first vantage point, means to successively emit said first defined sets of signals corresponding to successive rasters of a replica of such object from such first vantage point, means to successively produce second defined sets of picture signals corresponding to fields of viewing such object from a second vantage point, means to successively emit second defined sets of signals corresponding to successive rasters of a replica of such object from such second vantage point, means constituted to emit the sets of the first defined signals and the sets of the second defined signals in alternate successions of such sets, or to emit only successive sets of signals corresponding to viewing said object from a single one of such vantage points, selectively under control of an operator; together with a receiver including a viewing screen, means to receive and interpret the signals of said sets, including means to produce a raster on said viewing screen corresponding to each set of signals, and including means to produce first defined rasters corresponding to the first defined sets of signals and the second defined sets of signals, alternatively, for production of a first defined three dimensional picture on said viewing screen, or to produce only rasters corresponding to a single one of said sets of signals for production of a second defined two dimensional picture on the viewing screen, selectively; and receiver operator activated means constituted to select either of the alternative three dimensional picture production or the two dimensional picture production; wherein said receiver operator activated selecting means comprises a remote control means.

5. In a television system, the combination of a sending station including means to produce and emit first defined sets of video signals which when received and translated in a receiver produce a raster corresponding to viewing an object from a first defined vantage point, and including means to produce and emit second defined sets of video signals which when received and translated in said receiver produce a raster corresponding to viewing said object from a second defined vantage point, said video signals producing and emitting means including means to emit the first defined sets of video signals and the second defined sets of video signals in successive alternation; together with a receiver including means to receive both sets of video signals in the alternation of their production and to translate said two sets of video signals with production of rasters in such alternation and with production of a three dimensional picture, or to translate video signals corresponding to viewing said object from a single vantage point and with production of a two dimensional picture selectively; and receiver operator controlled means in connection with said receiving and translating means, constituted either to cause translation of both of the sets of video signals alternatively, corresponding to viewing said object from two vantage points alternatively and with production of the three dimensional picture, or to cause translation of the video signals corresponding to viewing such object from a single vantage point, with production of the two dimensional picture, selectively; wherein the receiver operator controlled means, comprises a coin-box prepay unit.

6. In a television system, the combination of a sending station including means to produce and emit first defined sets of video signals which when received and translated in a receiver produce a raster corresponding to viewing an object from a first defined vantage point, and including means to produce and emit second defined sets of video signals which when received and translated in said receiver produce a raster corresponding to viewing said object from a second defined vantage point, said video signals producing and emitting means including means to emit the first defined sets of video signals and the second defined sets of video signals in successive alternation; together with a receiver including means to receive both sets of video signals in the alternations of their production and to translate said two sets of video signals with production of rasters in such alternation and with production of a three dimensional picture, or to translate video signals corresponding to viewing said object from a single vantage point and with production of a two dimensional picture, selectively; and receiver operator controlled means in connection with said receiving and translating means, constituted either to cause translation of both of the sets of video signals alternatively, corresponding to viewing said object from two vantage points alternatively and with production of the three dimensional picture, or to cause translation of the video signals corresponding to viewing such object from a single vantage point, with production of the two dimensional picture, selectively; wherein the receiver operator controlled means, comprises a remote control means.

7. In a television system, the combination of a sending station including means to produce a set of picture signals corresponding to viewing elemental areas of an object, means to emit signals corresponding to a raster of a replica of such object, means to emit signals corresponding to a second defined intelligence other than said first defined picture signals, and means to emit a first defined control signal and a second defined control signal, said control signals being of different reception and translation characteristics, together with a receiver including means to receive and interpret the picture signals, means to produce a picture raster corresponding to the interpretations of said picture signals, means to receive and interpret said first defined control signal, means to receive and interpret said second defined control signal, means to receive the signals emitted corresponding to the second defined intelligence, means to interpret the second defined intelligence signal, connections between the second defined intelligence signal receiving means and the second defined intelligence interpreting means, including a first defined switch means having a first defined switch open position and a second defined switch closed position, connections between the interpreting means for the first defined control signal and said first defined switch means, constituted to cause said switch means to be in its switch open position when the first defined control signal is being received and interpreted, operator controlled means constituted to make ineffective the connections between the first defined control signal interpreting means and the means which causes the first defined switch means to be in its switch open position, said operator controlled means including a second defined switch means having a first defined switch open position and a second defined switch closed position, and connections between the means which interprets the second defined control signal and the second defined switch means, constituted to cause the second defined switch means to be in its switch closed position when the second defined control signal is being received and interpreted, wherein the signals emitted by the sending station corresponding to a second defined intelligence, comprise picture signals corresponding to viewing elemental areas of the object from a vantage point different from the vantage point of viewing the object for production of the first defined set of picture signals; and wherein the means in the receiver to interpret the second defined intelligence comprises means to produce a second raster corresponding to viewing said object from such vantage point which differs from the first mentioned vantage point.

8. A television system as defined in claim 7, wherein the operator controlled means comprises a prepay unit.

9. A television system as defined in claim 7, wherein the operator controlled means comprises a remote control unit.

References Cited

UNITED STATES PATENTS

| | | | |
|---|---|---|---|
| 2,301,254 | 11/1942 | Carnhan | 178—6.5 |
| 2,571,612 | 10/1951 | Rines | 178—6.5 |
| 3,020,341 | 2/1962 | Owens | 178—6.5 |
| 3,070,652 | 12/1962 | Banning | 178—6.8 |
| 3,089,917 | 5/1963 | Fernicola | 178—6.5 |

OTHER REFERENCES

A Rapid-Action Shutter With No Moving Parts, Edgerton and Wyckoff, April 1951, pp. 398–406, vol. 56–57.

Low Cost 3DTV, Electronics, July 1953, pp. 196–197.

JOHN W. CALDWELL, *Primary Examiner.*

DAVID G. REDINBAUGH, *Examiner.*

J. A. ORSINO, *Assistant Examiner.*